United States Patent
Williams, Jr.

(10) Patent No.: US 11,777,714 B2
(45) Date of Patent: Oct. 3, 2023

(54) MATRIX ENCRYPTION—A SYMMETRIC KEY ENCRYPTION TECHNOLOGY

(71) Applicant: Watson Knox Williams, Jr., Mobile, AL (US)

(72) Inventor: Watson Knox Williams, Jr., Mobile, AL (US)

( * ) Notice: Subject to any disclaimer, the term of this patent is extended or adjusted under 35 U.S.C. 154(b) by 103 days.

(21) Appl. No.: 17/644,894

(22) Filed: Dec. 17, 2021

(65) Prior Publication Data
US 2023/0198744 A1  Jun. 22, 2023

(51) Int. Cl.
*H04L 9/06* (2006.01)

(52) U.S. Cl.
CPC ........ *H04L 9/0656* (2013.01); *H04L 2209/34* (2013.01)

(58) Field of Classification Search
CPC .......... H04L 9/06; H04L 9/065–0668
See application file for complete search history.

(56) References Cited

U.S. PATENT DOCUMENTS

| | | | |
|---|---|---|---|
| 2002/0101996 A1* | 8/2002 | Takada | H04L 9/065 380/277 |
| 2017/0078086 A1* | 3/2017 | Rohloff | H04L 9/3093 |
| 2021/0320795 A1* | 10/2021 | Murdoch | H04L 9/3033 |

\* cited by examiner

*Primary Examiner* — Kevin Bechtel

(57) ABSTRACT

The foundation of Matrix Encryption is a discrete function called the Modified Combinatorial Batch Decimation Function (CBDF-Mod) and its asymmetric inverse (CBDI-Mod). Herein we disclose the nature of Matrix Encryption, an encryption technology built upon these two discrete functions, together with their shared, Secondary Variable Functions. Matrix Encryption implements a block encryption with arbitrary block size dependent upon the length of text to be encrypted, thereby allowing for keys of user desired length and for the surpassing of industry standards of security. A Master Key may be used to generate a Key Set containing keys of appropriate length for any data presented above a minimum length, up to a length corresponding to the length of a message for which the Master Key is appropriate. Matrix Encryption reads and writes numerically encrypted text to text files as designated by the user.

18 Claims, 40 Drawing Sheets

FIG. 3

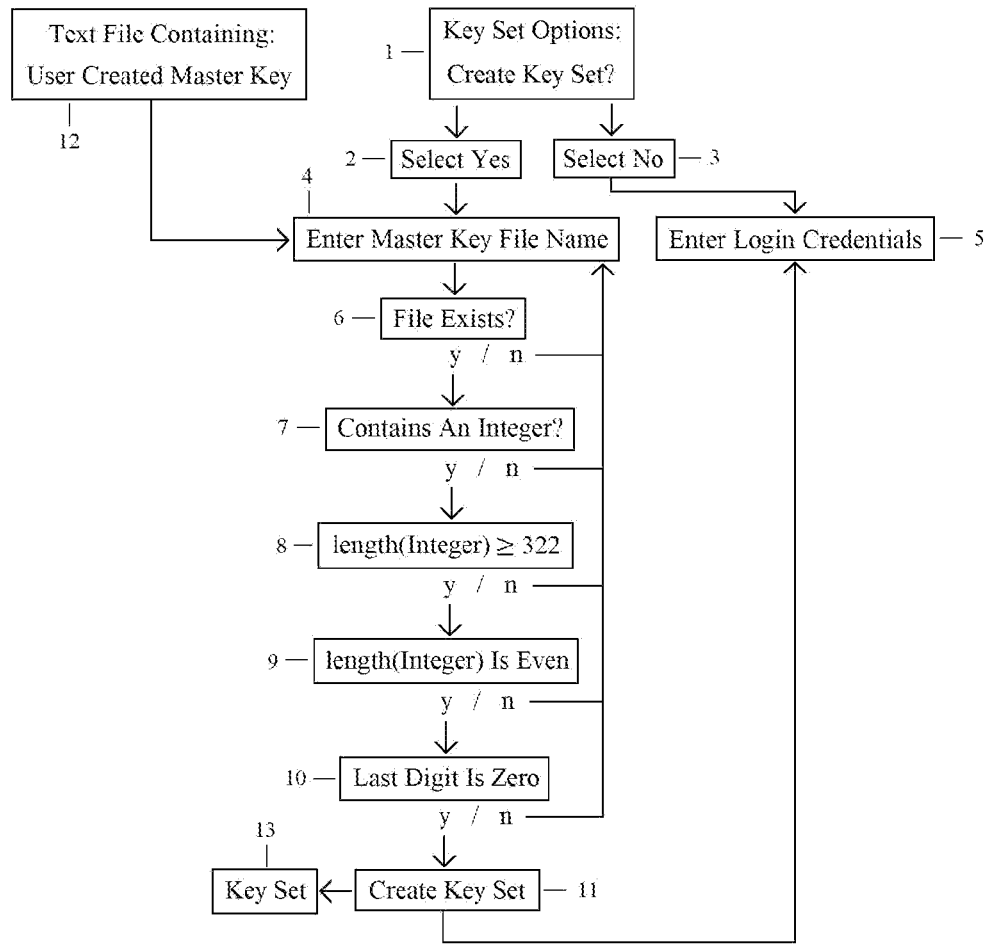

FIG. 4

```
                      To Create Key Set:
Master_Key_Length = len( str( Master_Key ))
while Master_Key_Length > 320:
 Key_Maker = open( Desired_Name.get() + "_Key_" + str(Master_Key_Length) + ".txt","w")
 Key_Maker.write(str(Master_Key))
 Key_Maker.close()
 Master_Key = Master_Key[:-1]
 Master_Key = Master_Key[:-1]
 Master_Key = Master_Key[:-1]
 Master_Key = Master_Key + "0"
 Master_Key_Length = len(str(Master_Key))
```

FIG. 5

$$eq\ 1:\ \ Number\ of\ Key\ Files\ Created\ =\ \frac{length(Master\ Key)}{2} - 160$$

FIG. 9

*Cipher Chart*

| | | | |
|---|---|---|---|
| a = 11 | A = 39 | spacebar = 68 | * = 97 |
| b = 12 | B = 41 | . = 69 | = = 98 |
| c = 13 | C = 42 | , = 71 | + = 99 |
| d = 14 | D = 43 | ? = 72 | |
| e = 15 | E = 44 | ! = 73 | |
| f = 16 | F = 45 | 1 = 74 | |
| g = 17 | G = 46 | 2 = 75 | |
| h = 18 | H = 47 | 3 = 76 | |
| i = 19 | I = 48 | 4 = 77 | |
| j = 21 | J = 49 | 5 = 78 | |
| k = 22 | K = 51 | 6 = 79 | |
| l = 23 | L = 52 | 7 = 81 | |
| m = 24 | M = 53 | 8 = 82 | |
| n = 25 | N = 54 | 9 = 83 | |
| o = 26 | O = 55 | 0 = 84 | |
| p = 27 | P = 56 | ' = 85 | |
| q = 28 | Q = 57 | : = 86 | |
| r = 29 | R = 58 | ; = 87 | |
| s = 31 | S = 59 | - = 88 | |
| t = 32 | T = 61 | _ = 89 | |
| u = 33 | U = 62 | $ = 91 | |
| v = 34 | V = 63 | % = 92 | |
| w = 35 | W = 64 | & = 93 | |
| x = 36 | X = 65 | ( = 94 | |
| y = 37 | Y = 66 | ) = 95 | |
| z = 38 | Z = 67 | / = 96 | |

*Any Unrecognized Character = 73*

FIG. 10

*To Detect Unrecognized Characters:* if i != "a" and i != "b" and i != "c" and . . .
L2.append("73")
Unrecognized_Character = True

*To Measure The Key:*

$2*length(Text) = S$ eq 2: $\quad 10^{S-1} < Key < 10^{S} - Encoded\ Text$

*To Obtain The Keyed Encoded Text:* eq 3: $\quad Keyed\ Encoded\ Text = Encoded\ Text + Key$

To Get Secondary Variables:

Keyed Encoded Text = X $2*length(X) = T$ eq 4: $Z = 10^T - 1$ eq 5: $z = 10^T + 1$ eq 6: $R = 10^{T-1}$ For $\lceil X/10 \rceil$ :

variable_A = str( X )

List_A = [ ]

for i in variable_A:
 List_A.append( i )

del List_A[ -1 ]

variable_B = "".join( List_A )

variable_C = int(variable_B) + 1 variable_C = $\lceil X/10 \rceil$

To Obtain the Encrypted Text use CBDF-Mod:

eq 7: Encrypted Text = $z + (R - \lceil X/10 \rceil) + (X - Z)$

Use "\n" to Separate Elements in a Log Entry

"\n" + "\n" at the Beginning of a Log Entry

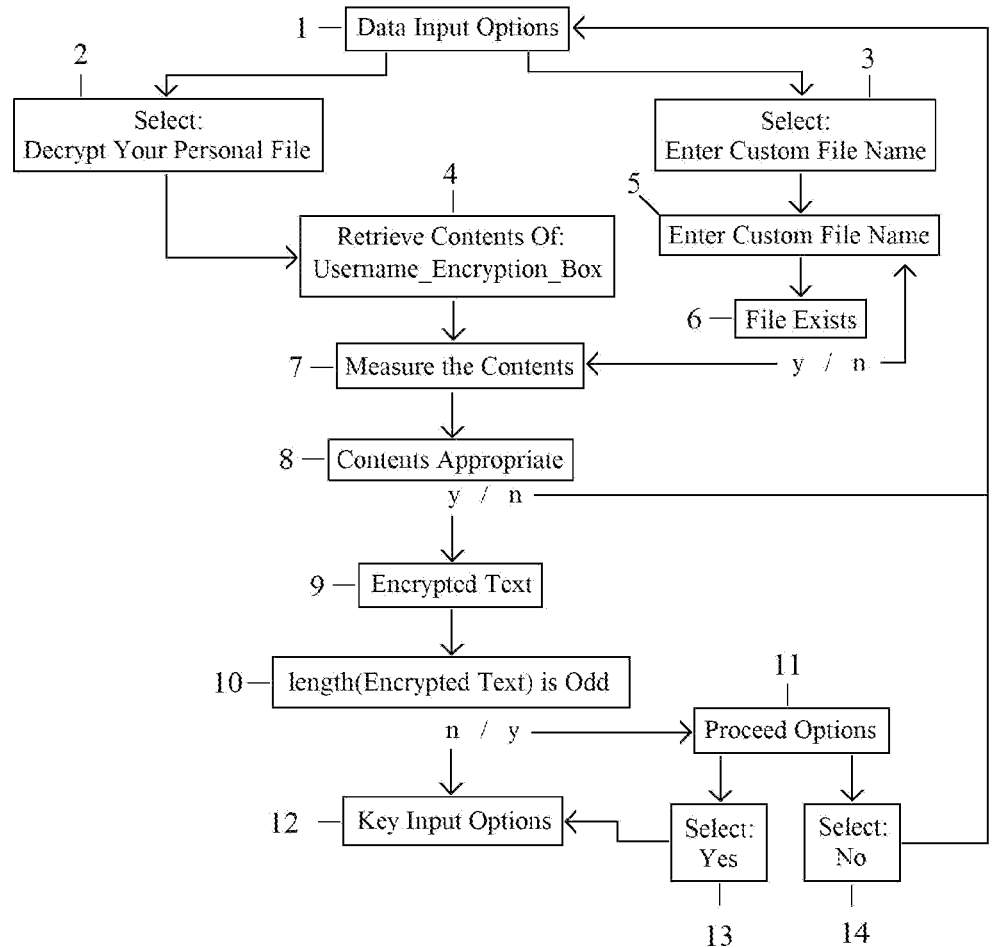

*To Measure The Key:*

*length(Encrypted Text) = V*

*eq 8:* $10^{V-1} < Key < 10^V$

*To Obtain the Unlocked Encrypted Text:*

*Unlocked Encrypted Text = x*

*eq 9:* $x = Encrypted\ Text - (Key - \lfloor Key/10 \rfloor)$

FIG. 33

```
1 → Get Secondary Variables
        ↓
2 → Obtain Encoded Text
        ↓
3 → Decode Encoded Text
```

FIG. 34

*To Get Secondary Variables:*

$Unlocked\ Encrypted\ Text = x$ $length(x) = Y$ $eq\ 10:\ Z = 10^Y - 1$ $eq\ 11:\ z = 10^Y + 1$

FIG. 35

*To Obtain the Encoded Text use CBDI-Mod:*

$eq\ 12:\ Encoded\ Text = Z - \left( \left\lfloor \frac{z-x}{9} \right\rfloor + z - x \right)$

FIG. 36

*To Control Rounding Error in Dividing by 9:* eq 13:  $N / 9 = \text{Trimmed Sum}(N) + \text{Digit Sum}(N) / 9$

For Example if $N = 2518022393$ $N / 9 = 279780265.\overline{8}$ and

Find the Trimmed Sum(N):

$$\begin{array}{r} 251802239 \\ 25180223 \\ 2518022 \\ 251802 \\ 25180 \\ 2518 \\ 251 \\ 25 \\ +\phantom{00}2 \\ \hline \end{array}$$

Trimmed Sum(N) = 279780262

Digit Sum(N) = 2 + 5 + 1 + 8 + 0 + 2 + 2 + 3 + 9 + 3 = 35

Digit Sum(N) / 9 = 35 / 9 = $3.\overline{8}$ $279780262 + 3.\overline{8} = 279780265.\overline{8}$

FIG. 37

*Technique to Implement* $\left\lfloor \dfrac{z - x}{9} \right\rfloor$ :

*Create two empty Lists:* $L3 = [\,]$ , $L4 = [\,]$ $variable00 = z - x$
$variable0 = str(variable00)$
while $len(variable0) > 1$:
  $variable0 = variable0[\,:-1\,]$
  $L3.append(variable0)$ for $i$ in $variable0$:
  $L4.append(i)$ $variable1 = 0$
for $e$ in $range(0, len(L3))$:
  $variable1 = variable1 + int(L3[\,e\,])$ $variable2 = 0$
for $f$ in $range(0, len(L4))$:
  $variable2 = variable2 + int(L4[\,f\,])$ $g = variable2 / 9$ $h = int(math.floor(g))$ $variable3 = int(variable1 + h)$ $variable3 = \left\lfloor \dfrac{z - x}{9} \right\rfloor$

*Master Key Requirements:*

*Positive Integer*
*At least 322 digits*
*Even Number of Digits*
*Ends in Zero*

*Recommendation 1:*
*First 2 Digits of Master Key*
*should be: 1 0*

*General Master Key Form:*

$$\text{CBDF-Mod}$$

$$f(X) = x$$

$$f(X) = z + (R - \lceil X/10 \rceil) + (X - Z)$$

$$ex: X = 2518022393 \quad len(X) = 10$$

$$Z = 10^{10} - 1 = 9999999999$$

$$z = 10^{10} + 1 = 10000000001$$

$$R = 10^{10-1} = 1000000000$$

$$\lceil X/10 \rceil = 251802240$$

$$R - \lceil X/10 \rceil = 748197760$$

$$z + (R - \lceil X/10 \rceil) = 10748197761$$

$$CBDI\text{-}Mod$$

$$f(x) = X$$

$$f(x) = Z - \left( \left\lfloor \frac{z-x}{9} \right\rfloor + z - x \right)$$

$$ex: \quad x = 3266220155 \quad len(x) = 10$$

$$Z = 10^{10} - 1 = 9999999999$$

$$z = 10^{10} + 1 = 10000000001$$

$$R = 10^{10-1} = 1000000000$$

$$\left\lfloor \frac{z-x}{9} \right\rfloor = 748197760$$

$$\left\lfloor \frac{z-x}{9} \right\rfloor + z - x = 7481977606$$

*CBDF-Mod with Key:*

$$f(X) = x$$

$$f(X) = z + (R - \lceil X/10 \rceil) + (X - Z)$$

ex: $X = 2518022393$    $len(X) = 10$ $Key = 5272534299$ $X = X + Key = 7790556692$ $Z = 10^{10} - 1 = 9999999999$ $z = 10^{10} + 1 = 10000000001$ $R = 10^{10-1} = 1000000000$ $\lceil X/10 \rceil = 779055670$ $R - \lceil X/10 \rceil = 220944330$ $z + (R - \lceil X/10 \rceil) = 10220944331$ $X - Z = -2209443307$ $10220944331 - 2209443307 = 8011501024$ $f(X) = 8011501024 = x$

FIG. 56

*CBDI-Mod with Key:*

$$f(x) = X$$

$$f(x) = Z - \left( \left\lfloor \frac{z-x}{9} \right\rfloor + z - x \right)$$

ex: $x = 8011501024$   $len(x) = 10$ $Key = 5272534299$ $\lfloor Key/10 \rfloor = 527253430$ $Key - \lfloor Key/10 \rfloor = 4745280869$ $x = x - (Key - \lfloor Key/10 \rfloor) = 3266220155$ $Z = 10^{10} - 1 = 9999999999$ $z = 10^{10} + 1 = 10000000001$ $R = 10^{10-1} = 1000000000$ $z - x = 6733779846$ $\left\lfloor \frac{z-x}{9} \right\rfloor = 748197760$ $\left\lfloor \frac{z-x}{9} \right\rfloor + z - x = 7481977606$ $9999999999 - 7481977606 = 2518022393$ $f(x) = 2518022393 = X$

FIG. 57

*Wrong Key Fails to Decrypt:*

$$f(x) = X$$

$$f(x) = Z - \left( \left\lfloor \frac{z - x}{9} \right\rfloor + z - x \right)$$

ex: $x = 8011501024$   $len(x) = 10$ $Key = 664458466 \neq 5272534299$ $\lfloor Key / 10 \rfloor = 66445846$ $Key - \lfloor Key / 10 \rfloor = 598012620$ $x = x - (Key - \lfloor Key / 10 \rfloor) = 7413488404$ $Z = 10^{10} - 1 = 9999999999$ $z = 10^{10} + 1 = 10000000001$ $R = 10^{10-1} = 1000000000$ $z - x = 2586511597$ $\left\lfloor \frac{z - x}{9} \right\rfloor = 287390177$ $\left\lfloor \frac{z - x}{9} \right\rfloor + z - x = 2873901774$ $9999999999 - 2873901774 = 7126098225$ $f(x) = 7126098225 \neq 2518022393$

FIG. 58

Zelda_Data_Log.txt

Time Stamp: 2021-11-24 23:24:26.120385
Character count: 161
Welcome to your Decryption Box. This is your 161-character sample message. It requires a 322 digit key to encrypt. Your Personal Encryption Box is created empty.
Zelda_Key_322.txt
Digit count: 322
7676696711809097076809549599298083820104654422905991450312724183739481405383752557525197694603031968494913611450378920364215065790130292738790356634534599341215414843421910851556218926724649708389417006639034600727756421607685723238280013354994293858129006247793792898280411684146787291319526687286172851068189709489177776
All data accounted for Time Stamp: 2021-11-24 23:25:47.455809
Digit Count: 322
7676696711809097076809549599298083820104654422905991450312724183739481405383752557525197694603031968494913611450378920364215065790130292738790356634534599341215414843421910851556218926724649708389417006639034600727756421607685723238280013354994293858129006247793792898280411684146787291319526687286172851068189709489177776
Zelda_Key_322.txt
Character count: 161
Welcome to your Decryption Box. This is your 161-character sample message. It requires a 322 digit key to encrypt. Your Personal Encryption Box is created empty.
All data accounted for

FIG. 59

Time Stamp: 2021-11-24 23:26:01.828963
Digit Count: 322
7676696711809097076809549599298083820104654422905991450312724183739481405383752557525197694603031968494913611450378920364215065790130292738790356634534599341215414843422191085155621892672464970838941700663903460072775642160768572323828001335499429385812900624779379289828041168414678729131952668728617285106818970948917776
Watson_Key_322.txt
Character count: 127
WSQ?I!1HdTdgL.xKZGmCH)XyJAi2,c11JO=el(bcw/(%
&Kw3Q,FY3;LT89(o*W/cf3MFNWh%&OZ1kZs!zk+
/NOioKHnT.in86_qO!D!oHkAs7Y_OsR(_.GZ=bhvVSS
Some characters were not recognized

FIG. 60

Time Stamp: 2021-11-27 10:04:49.182054
Character count: 161
 Welcome to your Decryption Box. This is your 161-character sample message. It requires a 322 digit key to encrypt. Your Personal Encryption Box is created empty
Zelda_Key_322.txt
Digit count: 322
8080725600127859701312029583030596572270183318522361965756131214706350394097741255523570943058757759505275732534306255990033391568572606948083027659454134207378974059334363572342499827403204886469218467631459103403867076896637394159873745856162032103231494219565858427176028054662230698483515406643436263598608471361722297
All data accounted for Time Stamp: 2021-11-27 10:06:18.142380
Digit Count: 322
8080725600127859701312029583030596572270183318522361965756131214706350394097741255523570943058757759505275732534306255990033391568572606948083027659454134207378974059334363572342499827403204886469218467631459103403867076896637394159873745856162032103231494219565858427176028054662230698483515406643436263598608471361722297
Watson_Key_322.txt
Character count: 134
 RC.E1QjL?%nP(WMKzvy/kLA9dbUy6yik&h0-hk,_+2 JgUis*0v/Y9-qDYfq+fU*Zw H7Uw'PZ7Tg./iHe%ppJEY'axGoFN?zlX;uPfqqZ% zsdJo(S_W8GID Ml$,4Hb$sRNp
Some characters were not recognized

FIG. 61

*Recommendation 2:*

*Place a single irrelevant character at the beginning of Text to be encrypted*

FIG. 62

*There are 9 one-digit positive integers, 90 two-digit positive integers, 900 three-digit positive integers . . .*

*Let N be a positive integer $\geq$ 322 digits in length, and possessing a strictly even number of digits*

*Let D be the number of digits of N*

*Letting E be the number of integers of length D, we have:*

$$E = 9 * 10^{D-1}$$

*Letting F be the number of Usable Keys of length D that end in '0' and begin with '10', we have:*

$$F = 9 * 10^{D-4}$$

*Letting D = 322, we calculate the odds of guessing the Shortest Possible Key in Matrix Encryption as:*

$$1 \text{ in } 9 * 10^{318}$$

*Letting G be the Percentage of Usable Keys of Length D, any value of D, gives:*

$$G = F / E = 10^{-3} = 0.1\%$$

*However the size of the Key and the Encoded Text both range, and a full account allows us to write:*

*Unrefined Range of G:*

$$0\% \leq G \leq 8.66\%$$

*Refined Range of G:*

$$0.1\% \leq G \leq 8.66\%$$

FIG. 63

81 Total Character Assignments

Vacant Assignments:

10  20  30  40  50  60  70  80  90

Reasons to avoid '0' as the ending digit of the Keyed Encoded Text:

1. To Preserve Injectivity

*Let $N$ be an Integer Ending in Zero, then:*

$f(N) = M$
   $f(N-1) = M$  $\rightarrow$  $f_{-1}(M) = ?$

2. To Preserve Method for Implementing $\lceil X/10 \rceil$

*Method always gives correct answer unless $X$ ends in zero:*

*example: Let $X = 25180$ $\rightarrow$ $\lceil X/10 \rceil = 2518$*

*Method as Shown in FIG. 10 gives: $\lceil X/10 \rceil = 2519$*

FIG. 64

*Calculate the Smallest Possible Integer with a Digit Sum 17 Digits Long:*

*Smallest Number with a Digit Sum of 10:*

$19$ or $2 * 10^1 - 1$ because $1 + 9 = 10$ ( 2 digits )

*Smallest Number with a Digit Sum of 100:*

$199999999999$ or $2 * 10^{11} - 1$ because $1 + 9 + 9 + 9 + 9 + 9 + 9 + 9 + 9 + 9 + 9 + 9 = 100$
( 12 digits )

*Smallest Number with a Digit Sum of 1000:*

$2 * 10^{111} - 1$   ( 112 digits )

*Smallest Number with a Digit Sum of 10,000,000,000,000,000:*

$2 * 10^{1,111,111,111,111,111} - 1$

This Number has $1,111,111,111,111,112$ digits

1 Byte per Digit gives: $1,111,111,111,111,112$ Bytes of Data

Dividing by 2 to Account for Character Assignments Gives:

$555,555,555,555,556$ Bytes    1 Petabyte $= 10^{15}$ Bytes

Rounding Error Limit $\approx 0.56$ Petabytes

*Original CBD Function:*

Let $X$ be a Terminating Decimal Such That: $0 < X < 1$ with $T$ = The Number of Digits of $X$ Behind the Decimal:

$$Z = 10^T - 1$$

$$z = 10^T + 1$$

$$R = 10^{T-1}$$

$$f(X) = z + (R - \lceil XR \rceil) + 10R(X-Z)$$

$a = (0.1, 3)\ \ b = (0.9, 11)$
$c = (0.01, 12)\ \ d = (0.99, 101)$
$e = (0.001, 102)\ \ f = (0.999, 1001)$
$g = (0.0001, 1002)\ \ h = (0.9999, 10001)$
$i = (0.00001, 10002)\ \ j = (0.99999, 100001)$

*Combinatorial*

*Batch*

*Decimation*

MATRIX ENCRYPTION—A SYMMETRIC KEY ENCRYPTION TECHNOLOGY

CROSS REFERENCE TO RELATED APPLICATIONS (Not Applicable)

STATEMENT REGARDING FEDERALLY SPONSORED RESEARCH OR DEVELOPMENT (Not Applicable)

INCORPORATION-BY-REFERENCE OF MATERIAL SUBMITTED ON A COMPACT DISC

DISC 1 Contains:
a. 00accountdatabase.txt, created Dec. 16, 2021, 0 Bytes.
b. cclogo5.gif, created Dec. 16, 2021, 4,327 Bytes.
c. Master_Key_1.txt, created Dec. 16, 2021, 2000 Bytes.
d. Master_Key_2.txt, created Dec. 16, 2021, 2000 Bytes.
e. Matrix Encryption-READ ME.pdf, created Dec. 16, 2021, 217,762 Bytes.
f. Matrix_Decryption.py, created Dec. 16, 2021, 46,512 Bytes.
g. Matrix_Encryption.py, created Dec. 16, 2021, 53,325 Bytes.
h. matrix_gui_background.gif, created Dec. 16, 2021, 74,606 Bytes.

DISC 2 Contains:
a. 00accountdatabase.txt, created Dec. 16, 2021, 0 Bytes.
b. cclogo5.gif, created Dec. 16, 2021, 4,327 Bytes.
c. Master_Key_1.txt, created Dec. 16, 2021, 2000 Bytes.
d. Master_Key_2.txt, created Dec. 16, 2021, 2000 Bytes.
e. Matrix Encryption-READ ME.pdf, created Dec. 16, 2021, 217,762 Bytes.
f. Matrix_Decryption.py, created Dec. 16, 2021, 46,512 Bytes.
g. Matrix_Encryption.py, created Dec. 16, 2021, 53,325 Bytes.
h. matrix_gui_background.gif, created Dec. 16, 2021, 74,606 Bytes.

BACKGROUND OF THE INVENTION

(1) Field of the Invention

The field is that of Cryptography or Data Science.

(2) Background Art

Replacement ciphers such as the Caesar Cipher were used in ancient times by the Romans to protect sensitive information from prying eyes, and for a time it was the state of the art. Encryption technology has always been useful, closely guarded, and has continued to evolve alongside its parent discipline mathematics up through the ages in order to meet the demands of secure communication in an unpredictable, ever growing and ever-changing environment.

In the present day, various forms of encryption technologies are used across the internet in communication and for various transmissions of data. By and large, encryption technologies operate in the background from the perspective of the average user who is scarcely aware that their data is even being 'end-to-end encrypted' much less what the encryption process involves.

For many such users there is no need or desire to know how encryption works as long as—it works, but for almost all users, at least some degree of privacy and control over personal data is desirable, regardless of how much the user seeks to be briefed on and in control of the process. Furthermore, there are those in various sectors who advocate for privacy and call for individual autonomy and control over personal data, including how personal data is encrypted, seeking a hands-on approach to encryption that demystifies it and brings it to the foreground.

In the wake of the wild and unpredictable success and demand for cryptocurrencies, NFT's, smart-contracts, DAO's, and other related technologies, the culture, and the public interest in encryption has never been higher.

This demand is driving a market for encryption technologies that offer a more tangible process that gets the user actively involved in the encryption of their own data rather than relying on nested technologies often little understood that operate as subroutines on an 'out of sight out of mind' basis. Concepts like tangibility, approachability and user control are keys to enhancing the meaning and value of an individual's experience of and interaction with important digital processes.

This surging interest in cryptocurrencies and by association cryptography is in general indicative of a still broader revolution into data and knowledge acquisition that is ongoing.

Prior to Matrix Encryption, and relevant to all forms of encryption technologies including AES and RSA, the real question for any encryption technology has always been and will likely always remain—How secure is it?

Although not final in authority on the strength of an encryption, a general metric of relative security is key size, which is measured in bits. AES—The American Encryption Standard, is a symmetric key encryption that uses keys between 128-256 bits in length. RSA is an asymmetric technology that uses keys of greater length, generally between a length of 1024 to 4096 bits.

In RSA encryption, which is generally thought to be the most secure, prime numbers are used that, in digits, commonly range from about 309 digits up to 1,234 digits. Granted, there are infinitely many prime numbers, and any arbitrarily large prime may theoretically be used in RSA, but the larger primes become, the harder they are to find for use. Prime numbers are central to RSA, and integers that are not prime are ignored. Therefor the percentage of usable numbers out of all the integers with a given length, is greatly limited because of the sheer volume of composite numbers of suitable length that are rejected as not suitable for use because they are not prime.

In Matrix Encryption, keys must be positive integers that end in zero, so they are all even numbers, and they are easy to generate because the user simply makes them up using whatever resources the user desires and has available (see FIG. 48). Unlike RSA, with Matrix Encryption, there is no barrier of excess calculation time for very large Keys. Keys of arbitrary length take roughly the same amount of time to construct. Matrix Encryption measures Keys in digits rather than bits, because the user acts directly with their keys in base 10 and has a conventional lower bound of key size set to 322 digits. As with RSA there is no upper bound to possible key size, but the number of possible keys with a given number of digits, in comparison to RSA is much greater.

Out of the 9 one-digit integers (i.e., 1, 2, 3, 4, 5, 6, 7, 8, 9), 4 are prime numbers, for a total of 44.44%. Out of the 90 two-digit integers (i.e., 10, 11, . . . 98, 99), 21 are prime numbers, for a total of 23.33%. Out of the 900 three-digit integers (i.e., 100, 101, . . . 998, 999), 143 are prime numbers, for a total of 15.88%. Out of the 9000 four-digit integers (i.e., 1000, 1001, . . . 9998, 9999), 1061 are prime numbers, for a total of 11.78%. As the number of digits increases, though the total number of primes with that number of digits increases accordingly, the percentage of primes in the next larger sample size will always be smaller (i.e., 44.44%, 23.33%, 15.88%, 11.78%, . . . ) and moreover, the percentage will approach 0% as a limit at infinity.

In Matrix Encryption, integers with an odd number of digits are not compatible with the encoding technique, so in general and for integers with an even number of digits, of at least 322 digits in length, somewhere between 0.1% and 8.66% of all the integers of a given even length, constitute suitable Keys (see FIG. 62). This percentage range is constant, independent of integer length, and grows in significance in comparison to RSA as numbers increase in size.

ICSF is a software component of z/OS by IBM. ICSF uses a Master Key and a Key Set concept. Matrix Encryption also uses a Master Key to create an assorted Key Set. This technique is done as a means of time compensation, because the length of a Key used in Matrix Encryption must correspond to the length of data to be encrypted or decrypted, and so it is convenient to have an automatically generated Key Set ready with Keys appropriate for Text and Encrypted Text of various lengths.

The problem with the current state of the art isn't that current encryption technologies are not secure, but fundamentally that they can always be more secure. Inventors in the field of cryptography must continue to push the boundaries of security, while at the same time not losing sight of the end user who desires availability and control. In some sense, the problem in modern cryptography can be understood as a matter of human psychology, and psychology drives behavior. No matter how secure a technology is, an understanding of the inherent limitations eventually settle on the mind such that the eventuality is a desire for improvement. Additionally, no matter how efficient it is to have technology work automatically, the desire to understand it and be in control of it will always remain a part of the human equation and condition.

BRIEF SUMMARY OF THE INVENTION

Matrix Encryption is a form of symmetric key encryption technology based on a unique pair of asymmetrically related functions, with three secondary variable functions common to both, and constituting a family of five functions. There is a separate encryption program and a separate decryption program. Combined with a number of technical scaling solutions, a user friendly, actively engaging experience is presented. Manually created Master Keys are used to generate Key Sets, elements of which in turn are automatically retrievable during encryption and decryption, with the length of the key appropriate depending on the length of the data to be encrypted or decrypted. Key Sets may be deleted after use, and a Master Key returned to a secure location. Matrix Encryption is advantageous in data security because of the ease in creating Keys of arbitrary length, and because of the constant percentage range of valid Keys with a given number of digits.

BRIEF DESCRIPTION OF THE SEVERAL VIEWS OF THE DRAWING(S)

The Drawings consist of 40 pages and 66 Figures.

FIG. 3 shows key set options and key set creation.

FIG. 4 shows the technique used to create a key set.

FIG. 5 shows how to calculate the number of key files created from a master key.

FIG. 9 shows the numeric assignments used to encode text.

FIG. 10 shows the technique used to detect unrecognized characters.

FIG. 27 shows data input options and the processing of encrypted text.

FIG. 28 shows the minimum length requirement for processing encrypted text.

FIG. 29 shows the technique used to determine whether encrypted text is composed of an odd number of characters.

FIG. 33 shows how the encoded text is obtained.

FIG. 34 shows how the secondary variables are obtained.

FIG. 35 shows explicitly the CBDI-Mod function for obtaining the encoded text from the unlocked encrypted text.

FIG. 36 shows the technique used for controlling rounding error in dividing by 9.

FIG. 37 shows explicitly the code for controlling rounding error in dividing by 9.

FIG. 53 shows an example solve of CBDF-Mod.

FIG. 54 shows an example solve of CBDI-Mod.

FIG. 55 shows an example solve of CBDF-Mod with key implementation.

FIG. 56 shows an example solve of CBDI-Mod with key implementation.

FIG. 57 shows an example solve of CBDI-Mod with key implementation, in which a wrong key is used.

FIG. 58 shows an example of how data is written to the data log.

FIG. 59 shows an example data log in which an encrypted message was decrypted using an incorrect key.

FIG. 60 shows an example data log and focuses on the first character of the text.

FIG. 61 shows a recommendation for increased security of information.

FIG. 62 shows the calculation for the percentage of usable keys of a given length N.

FIG. 63 shows two reasons why zero is avoided as the ending digit of keyed encoded text.

FIG. 64 shows a calculation of the theoretical rounding error limit for decrypting text.

DETAILED DESCRIPTION OF THE INVENTION

Figure 1:
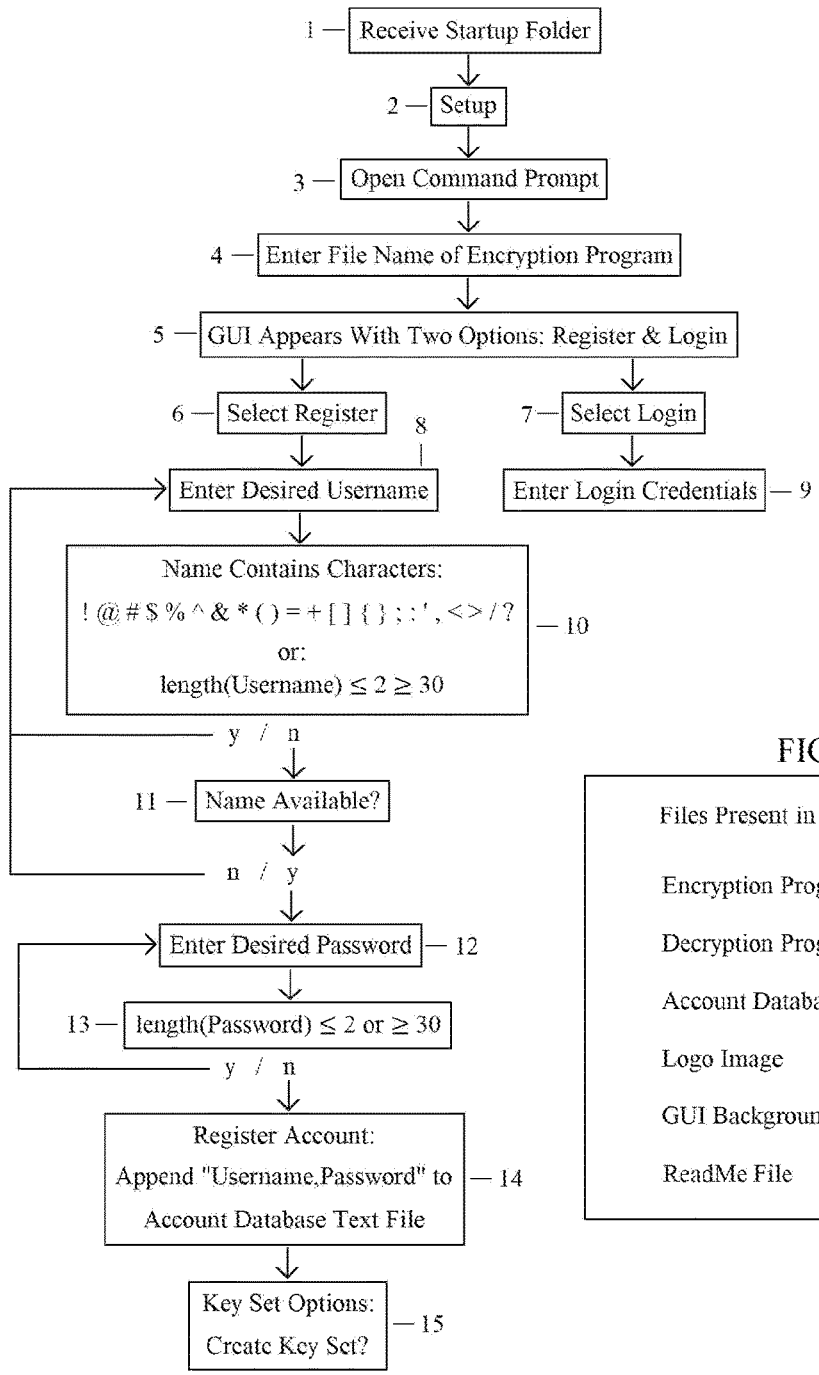
FIG. 1 shows the process of launching the program and registering an account.

FIGS. 1-1: A new user receives a Matrix Encryption Startup Folder from an authorized source. The Folder contains both the encryption program and the decryption program, together with other related files.

Figure 2:
FIG. 2 shows the files present in the startup folder.

FIGS. 1-2: To setup Matrix Encryption, the user will place all files found in the Matrix Encryption Startup Folder into a user designated Python file path folder. Once all Startup files are in the path designated to Python files, and the user has ensured that the latest version of Python is installed on the user's computer, the Setup process is complete.

FIGS. 1-3: Run Command Prompt (i.e., C:\WINDOWS\system32\cmd.exe) by pressing the Windows key and 'r' at the same time, then typing 'cmd'.

FIGS. 1-4: Next, the user will enter the name of the Python file containing the encryption program into Command Prompt and hit enter.

FIGS. 1-5: Upon correctly entering the file name, the user's computer will locate the encryption program from the user designated Python file path, and run the encryption program, at which point a GUI will appear with two options, 1) Register and 2) Login.

FIGS. 1-6: All new users will need to select the Register button in order to create an account with which to login and access program features.

FIGS. 1-7: Returning users have the option of selecting the Register button or the Login button.

FIGS. 1-8: Upon selecting the Register button, the user is prompted to enter a desired Username.

FIGS. 1-9: If a returning user selects Login, the user will be prompted to enter their Login Credentials.

FIGS. 1-10: To check legality of the desired Username, Matrix Encryption cross-references the characters in the desired Username against a list of characters deemed to be illegal because the Username must be used to generate legal text file names. If a desired Username contains inappropriate characters, the user will be routed back to entering a desired Username. If a desired Username does not contain any prohibited characters, the length of the desired Username is checked to see if the Username is too short or too long. If the desired Username is composed of fewer than 3 characters it will be rejected, and the user will be routed back to entering a desired Username. If the desired Username is greater than 29 characters in length, it will be rejected, and the user will be routed back to entering a desired Username. Finally, if a desired Username contains no illegal characters, and is between 3 and 29 characters in length, the desired Username will be deemed legal.

FIGS. 1-11: After a desired Username is deemed legal, the desired Username is checked for availability by cross-referencing the desired Username against the Account Database, which is a text file that is initially empty and present in the Matrix Encryption Startup folder. If an exact match is found between the desired Username and a Username already present in the Account Database, the user will be routed back to entering a desired Username. If no exact matches are found between the desired Username and the Usernames already present in the Account Database, the desired Username is deemed available.

FIGS. 1-12: Once a desired Username is deemed to be available, the user is prompted to enter a desired password.

FIGS. 1-13: Once a desired Password is entered, the length of the desired password is checked for appropriateness. If the desired Password contains fewer than 3 characters, it is deemed to be too short, and the user is routed back to entering a desired Password. If the desired Password contains more than 29 characters, it is deemed to be too long, and the user is likewise routed back to entering a desired Password. If a desired Password contains between 3 and 29 characters, it is approved.

FIGS. 1-14: When a desired Password is approved, the new Username and Password will be appended to the Account Database.

FIGS. 1-15: After the new Account is registered to the Account Database, the user is taken to Key Set Options.

FIG. 2: The Matrix Encryption Startup Folder is obtained from an authorized source and contains all the files a user needs to get started with Matrix Encryption. The total number of files in the Startup Folder is six: 1) The Encryption Program—a Python file, 2) The Decryption Program—a Python file, 3) The Account Database—a text file, 4) A Logo Image that is a GIF file, 5) A GUI Background Image that is also a GIF file, and 6) A ReadMe Word File (.docx) similar in content to the Specifications herein, that functions as a User Manual.

FIGS. 3-1: After the new Account is registered to the Account Database, the user is taken to Key Set Options, where the user is asked if the user would like to create a Key Set. The two options are 1) Yes and 2) No.

FIGS. 3-2: The user may select Yes.

FIGS. 3-3: The user may select No.

FIGS. 3-4: If the user selects Yes, the user is prompted to enter the name of the file containing the Master Key.

FIGS. 3-5: If the user selects No, Key Set creation is bypassed, and the user is taken directly to entering Login Credentials.

FIGS. 3-6: Upon entering the name of a text file, Matrix Encryption checks to see whether the file specified exists. If the file does not exist, the user is routed back to entering in the name of a Master Key file. If the file is found to exist, the process of Master Key verification proceeds.

FIGS. 3-7: If a specified file is found to exist, the contents are checked to see if the contents is an integer. If the file contents are not an integer, the user is routed back to entering in the name of a Master Key file. If the contents are found to be an integer, the process of Master Key verification proceeds.

FIGS. 3-8: If a specified file is determined to contain an integer, the length of the integer is checked. If the integer is 321 digits or fewer in length, then the file is rejected, and the user is routed back to entering in the name of a Master Key file. If the integer is found to be of sufficient length, (i.e., 322 digits in length or greater) then the process of Master Key verification proceeds.

FIGS. 3-9: If a potential Master Key is found to be of sufficient length, the length of the integer is further checked to ensure that the integer is composed of an even number of digits. If the integer is composed of an odd number of digits, the Master Key will be rejected, and the user will be routed back to entering in the name of a Master Key file. If the integer is found to be composed of an even number of digits, then the potential Master Key proceeds in the Master Key verification process.

FIGS. 3-10: If a file is found to contain an integer of at least 322 digits in length that is composed of an even number of digits, the final digit of the integer is checked. If the final digit of the integer is not '0', then the Master Key is rejected, and the user is routed back to entering in the name of a Master Key file. If the final digit of the integer is found to be '0', then the Master Key is approved.

FIGS. 3-11: If a Master Key is approved, a Key Set will be automatically generated, and the user will be routed to entering in user Login Credentials.

FIGS. 3-12: The Master Key File is a text file containing a user created Master Key that after creation must be placed into the user specified Python path folder.

FIGS. 3-13: The Key Set is automatically generated from a user uploaded Master Key, and every member Key File of that Key Set will be saved into the user specified Python path folder.

FIG. 4: A Key Set is generated with a while loop that recursively writes the Master Key to a new file named (i.e., Username_Key_Length(MasterKey), and then removes the last 3 digits of the Master Key, then adds a '0' to the end of the remaining characters before reassigning the length of the Master Key, and finally looping back around to the beginning of the while loop. This happens until the length of the master key reaches 322.

FIG. 5: Equation 1 shows the how to calculate the number of Key Files that are generated from a given Master Key. Take the length of the Master Key and divide it by 2, then subtract 160. For instance, if a Master Key is 10,000 digits in length, then the number of Key Files created in the Key Set will be 10,000/2−160=4,840 Key Files. In this case, the Key Files in the Key Set will have names as follows: Username_Key_10000, Username_Key_9998, Username_Key_9996, . . . Username_Key_326, Username_Key_324, Username_Key_322.

Figure 6:
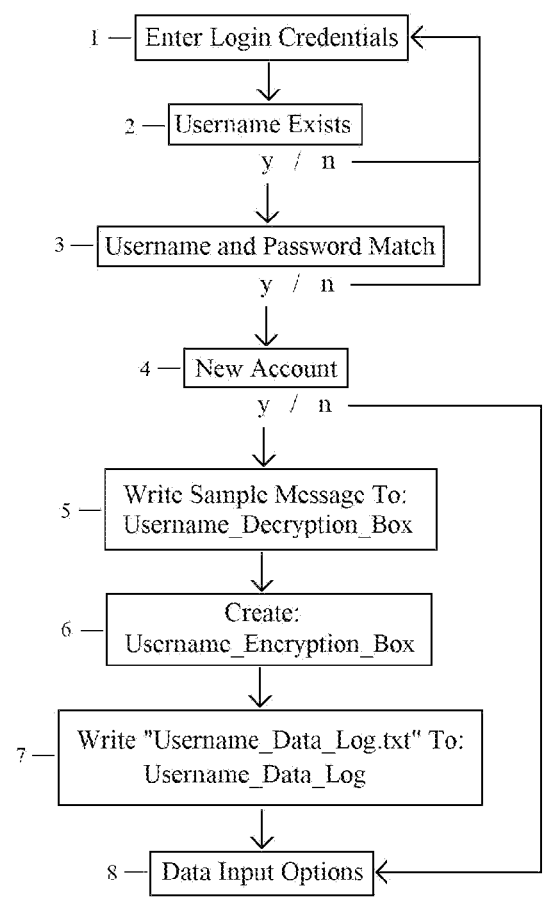
FIG. 6 shows the process of logging in and file creation.

FIGS. 6-1: Login Credentials are encountered for returning users, and for newly registered users after having successfully created a Key Set or after having declined the creation of a Key Set. Upon reaching the point of entering Login Credentials, the user will enter a valid Username and Password.

FIGS. 6-2: After a Username and Password are entered, an attempt is made to locate the Username by cross-referencing it with the Account Database. If the Username entered is not found in the Database, the user will be routed back to entering in user Login Credentials. If the Username entered is found to exist, the Login Verification process continues.

FIGS. 6-3: After the Username is located, the Username and Password entered are checked against the Password on file for that Username. If the Password entered does not match the Password on file for the given Username, then the user will be routed back to entering in Login Credentials. If the Password entered matches the Password on file for the given Username, then the Login is successful.

FIGS. 6-4: Upon successful Login, it is determined whether the Account is newly registered. If the account is new, the user proceeds to User File Creation. If the account is not new, the user will bypass User File creation, and be routed to Data Input Options.

FIGS. 6-5: Upon successfully logging in, being a newly registered account will prompt the creation of a personal decryption text file named as follows: Username_Decryption_Box. The following Sample Message is written to the personal decryption file: Welcome to your Decryption Box. This is your 161-character sample message. It requires a 322-digit key to encrypt. Your Personal Encryption Box is created empty.

FIGS. 6-6: After the personal decryption file is created, the personal encryption file is created. The personal encryption file is named: Username_Encryption_Box. The personal encryption file is created empty.

Figures 7, 8:
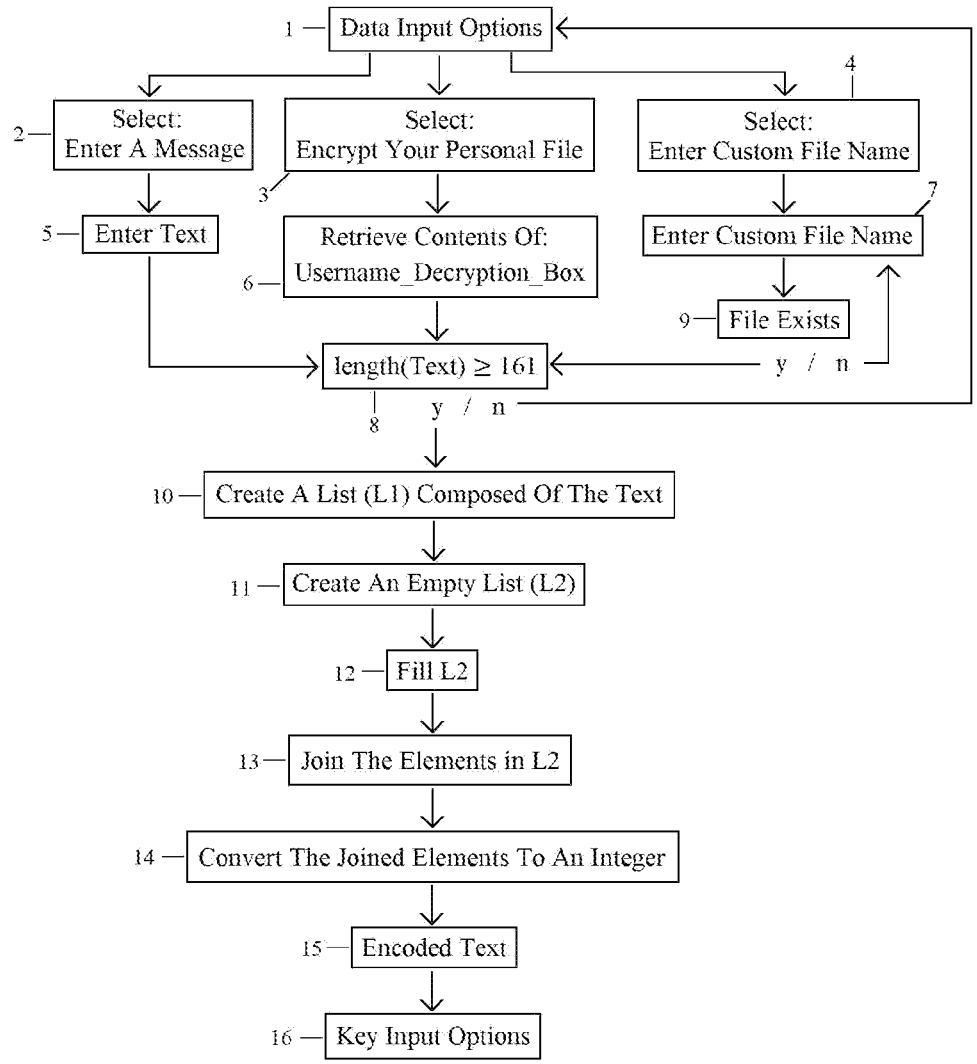
FIG. 7 shows data input options and the process of encoding text.
FIG. 8 shows the technique used to encode text.

FIGS. 6-7: After the personal encryption file is created, the user's Data Log file is created with the contents 'Username_Data_Log.txt' being written to the Data Log. Thus, the creation of new user files is concluded.

FIGS. 6-8: After the creation of new user files is concluded, the user is routed to Data Input Options.

FIGS. 7-1: Upon arriving at Data Input Options, the user is given three options: 1) Enter A Message, 2) Encrypt Your Personal File, and 3) Enter Custom File Name.

FIGS. 7-2: The user may select 'Enter a Message'.

FIGS. 7-3: The user may select 'Encrypt Your Personal File'.

FIGS. 7-4: The user may select 'Enter Custom File Name'.

FIGS. 7-5: Upon selecting the 'Enter a Message' option, the user is prompted to enter some data to be encrypted. The data can be typed in manually or pasted.

FIGS. 7-6: Upon selecting the 'Encrypt Your Personal File' option, the contents of the file named Username_Decryption_Box will be automatically retrieved for encryption. The file is assumed to exist and be available.

FIGS. 7-7: Upon selecting the 'Enter Custom File Name' option, the user is prompted to enter the name of a text file which the user would like to encrypt.

FIGS. 7-8: Incoming data is checked to determine whether it meets the minimum character requirement. If the data is composed of fewer than 161 characters, it is rejected, and the user is routed back to Data Input Options.

FIGS. 7-9: A custom file name is used to determine whether the given file exists. If the file is not found, the user is routed back to entering in the name of a Custom File. If the file is found, the length of the contents will be checked.

FIGS. 7-10: Data of sufficient length is prepared for encoding. The first step in this process is to define a List (L1) and fill it with the text to be encrypted.

FIGS. 7-11: After L1 is created, an Empty List (L2) is created.

FIGS. 7-12: After L1 and L2 have been created, L2 is filled with encoded elements of L1.

FIGS. 7-13: After L2 has been filled with encoded elements corresponding to the characters in L1, the elements in L2 are joined together creating an encoded string.

FIGS. 7-14: The encoded string is converted to an integer.

FIGS. 7-15: The encoded integer becomes a global variable for use throughout the program. It is called the Encoded Text.

FIGS. 7-16: Once the Encoded Text is obtained, the user is routed to Key Input Options.

FIG. 8: In order to fill L2 with encoded elements of L1, a for loop is used, such that for all elements i in L1, if i is equal to a given character, then a particular 2-digit encoding is appended to L2 corresponding to that character. This happens for all elements in L1 from the first character to the last character, thus preserving the original order of the data.

FIG. 9: A Cipher Chart with 81-character assignments is used to generate the Encoded Text. If a character is not recognized, '73' will be appended to L2 in representation of the unrecognized character. The character assignments are arbitrary, with the reservation that all assignments be strictly 2-digit assignments and that no character assignments end in '0'. Character assignments may be altered within these parameters if so desired, and the characters themselves may be replaced as needed.

FIG. 10: To detect Unrecognized Characters in Text, it is sufficient to say that if i in L1 does not equal any of the 81 characters as defined, that '73' be appended to L2 in recordation of the event, and that the global variable 'Unrecognized_Character' become True. This works for characters not on the Cipher Chart including:

[ ] { } | \ @ < > # ^ "

however, the presence of some special characters not listed above in Text may result in a UnicodeEncodeError.

FIGS. 7-1: After obtaining the Encoded Text, the user is routed to Key Input Options whereby the user is presented with 3 options: 1) Enter a Key, 2) Upload a Personal Key, and 3) Upload a Custom Key.

FIGS. 7-2: The user may select 'Enter a Key'.

FIGS. 7-3: The user may select 'Upload Personal Key'.

FIGS. 7-4: The user may select 'Upload a Custom Key'.

FIGS. 7-5: Upon selecting the 'Enter a Key' option, the user is prompted to enter a Key. A Key of appropriate length can be entered manually or pasted.

FIGS. 7-6: Upon selecting the 'Upload Personal Key' option, an attempt is made to retrieve the contents of a particular Key File in the user's Key Set. The name of the file the program will attempt to open is 'Username_Key_2*length(Text)'. This means that if for example the Text is 500 characters in length, the encryption will require a Key 1000 digits in length, and the name of the Key File the program will attempt to access will be named 'Username_Key_1000'. A 1000-character message will require a 2000 digit Key, and in that case the Key File the program will attempt to access will be 'Username_Key_2000'.

FIGS. 7-7: Upon selecting the 'Upload a Custom Key' option, the user is prompted to enter the name of a file containing a Key of appropriate length.

FIGS. 7-8: A given Key File must first be checked to see if it exists. If whether by the Personal or the Custom option a Key File is found not to exist, the Key File is rejected, and the user is routed back to Key Input Options. If a Key File is found to exist, the Key process continues.

FIGS. 7-9: A Potential Key must be measured.

FIGS. 7-10: After a Potential Key is measured a Potential Key is deemed to be appropriate or inappropriate depending on its length. If a Potential Key is too short or too long, it is rejected, and the user is routed back to Key Input Options. If the Key is not an integer, a value error is triggered, and the user is routed back to Key Input Options. If on the other hand a Potential Key is found to be an integer of appropriate length, then the Key process continues.

FIGS. 7-11: After a Key is determined to be an integer of appropriate length, the Key is used to obtain the Keyed Encoded Text.

FIGS. 7-12: After the Keyed Encoded Text is obtained the calculation proceeds to getting Secondary Variables.

Figures 11, 12, 13:
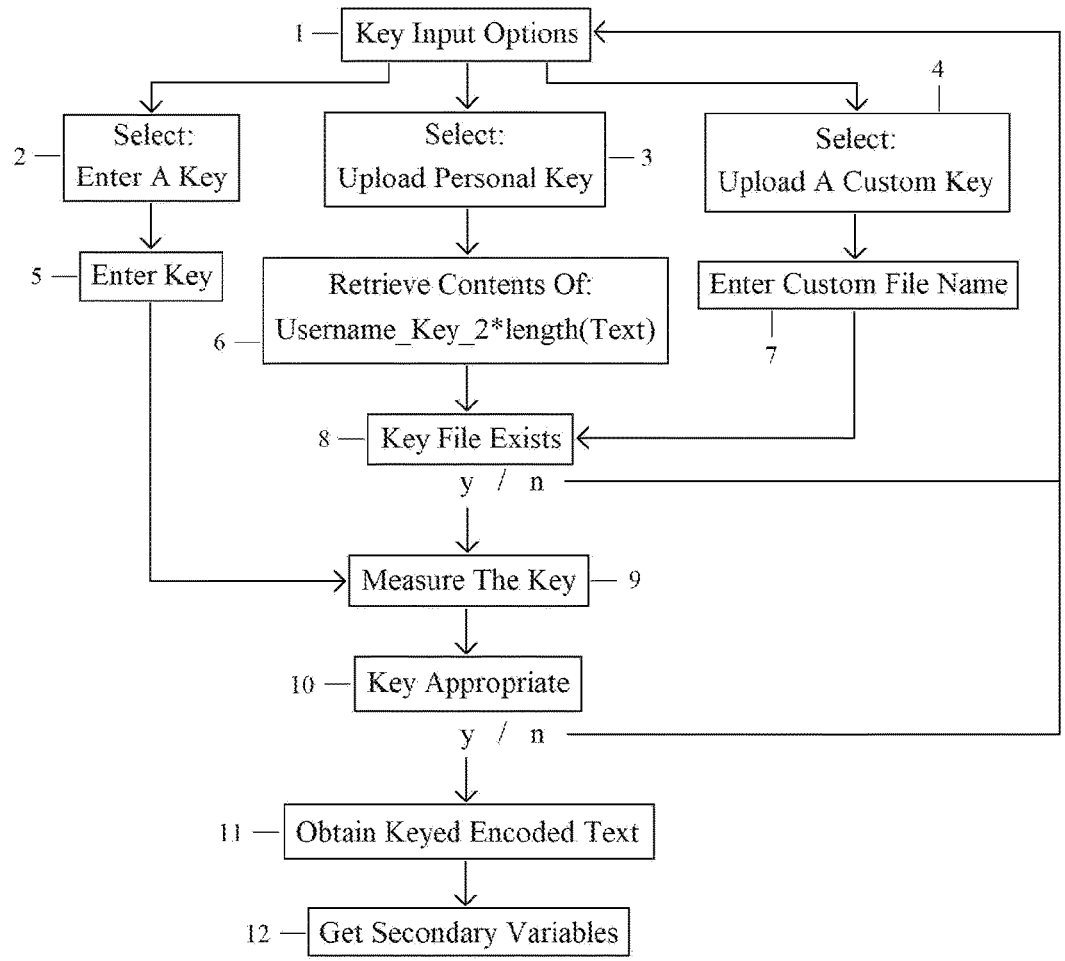
FIG. 11 shows key input options and key processing.
FIG. 12 shows how a key is measured for encrypting.
FIG. 13 shows how the keyed encoded text is obtained from the encoded text and a key.

FIG. 12: A Key is measured by attempting to place it between a lower and an upper bound, as determined by the length of the Text to be encrypted. Let S=2*length(Text). Then, for the lower bound we have that the Key should be larger than $10^{S-1}$. This means that if a Text to be encrypted is 500 characters in length, $S=1000 \rightarrow 10^{S-1}=10^{999}$. So, in this case, the lower bound of appropriate Key size for a 500-character message will be a '1' followed by nine hundred and ninety-nine zeros (i.e., the smallest possible 1000-digit integer). In general, the lower bound of Key size is always the smallest possible integer with a given number of digits corresponding to twice the length of the Text to be encrypted.

The upper bound of Key size is defined as $10^S$ minus the Encoded Text. This is the Compliment of the Encoded Text. If a Key is greater than or equal to the Compliment of the Encoded Text, it must be rejected, otherwise the Keyed Encoded Text would gain an additional digit (i.e., S+1) and would thereby have an odd number of digits which would constitute a corruption of data during decoding. Any Key with more digits than the Encoded Text, regardless of whether the number of digits is even, is not compatible with the Key System.

The larger the Compliment of the Encoded Text, the more possible Keys will be appropriate.

The Complement being large or small depends on the character assignment of the first character present in the Text to be encrypted. Having an Encoded Text that begins with '11' for example, maximizes the number of valid Keys that will not be larger than the Compliment of the Encoded Text. If the Encoded Text began with '11', the Compliment of the Encoded Text would begin with '89'. Certainly, anything up to a Key that begins with '87' would be ok in this example, because no matter what the digits behind '11' and '87' are, when they are added together, the first two digits of the Keyed Encoded Text can be no greater than '98' or '99' if there is a 1 carried over from the digits in the $3^{rd}$ position (i.e., the '11X' position and the '87X' position), thus for Encoded Text of length S that begins with '11', a Key of appropriate size, will be any integer between $10^{S-1}$ and $10^S$ whose first 2 digits are no larger than '87'. If an Encoded Text begins with '87', then an appropriate Key would need to begin with '11'. Beginning a Key with '10' is also possible. As a convention, using Keys that begin with '10' gives the broadest range of Key compatibility with the variable digits of Encoded Texts, up to and including '-=88' on the Cipher Chart (See FIG. 9) (See further FIG. 50).

FIG. 13: The Keyed Encoded Text is obtained by adding the Key to the Encoded Text, both as integers:

Keyed Encoded Text=Encoded Text+Key

Figures 14, 15, 16, 17:
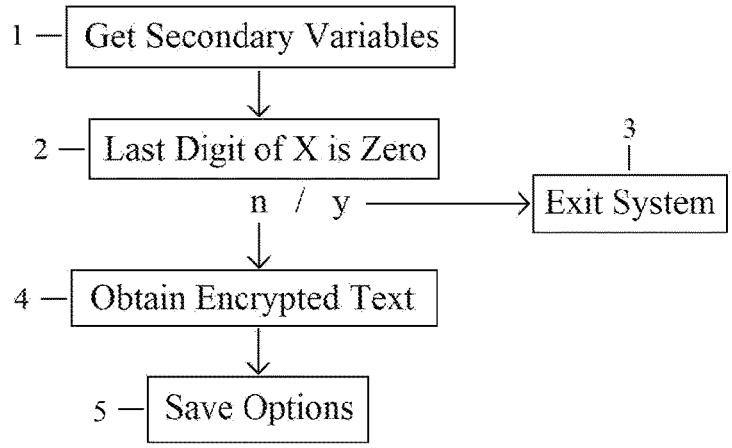
FIG. 14 shows the process of encrypting text.
FIG. 15 shows the equations used get secondary variables.
FIG. 16 shows how the ceiling of X/10 is implemented.
FIG. 17 shows the function used to obtain the encrypted text.

FIGS. 14-1: After the Keyed Encoded Text is obtained, the process of getting Secondary Variables is executed.

FIGS. 14-2: Once the Secondary Variables have been obtained, the last digit of the Keyed Encoded Text is checked as a formality, to see if the last digit is '0'. The last digit of the Keyed Encoded Text is checked in this way, however it is impossible for the last digit of the Keyed Encoded Text to be '0' with stock program settings because the last digit of the Key is always '0' but the last digit of any Encoded Text is never '0' according to the Cipher Chart. And since 0 plus 1 or 2 or 3 or 4 or 5 or 6 or 7 or 8 or 9 is never equal to zero, we know deductively that the last digit of any Keyed Encoded Text will never be '0'. This step is only necessary as a failsafe and as a reminder of function dynamics (See further FIG. 63).

FIGS. 14-3: If the last digit of the Keyed Encoded Text is found to be '0', the program closes.

FIGS. 14-4: After the last digit of the Keyed Encoded Text is confirmed not to be '0', the Encrypted Text is thereby calculated and obtained.

FIGS. 14-5: After the Encrypted Text is obtained, the user is routed to Save Options.

FIG. 15: Secondary Variables are obtained using three distinct functions. There are a total of 3 Secondary Variables: 1) Z, read 'Big-Zee', 2) z, read 'little-zee', and R, read 'R' or 'R-Total'. If X is allowed to equal the Keyed Encoded Text, and T is allowed to equal 2*length(X), the Secondary Variables then are given by:

$$Z=10^T-1$$

$$z=10^T+1$$

$$R=10^{T-1}$$

FIG. 17: After the Secondary Variables Z, z, and R have been calculated, the Encrypted Text is calculated using the Modified Combinatorial Batch Decimation Function (CBDF-Mod). In general, f(X) is given by:

$$f(X)=z+(R-\lceil X/10\rceil)+(X-Z)$$

⌈X/10⌉ is the ceiling of the Keyed Encoded Text divided by 10.

FIG. 16: The need to perform ⌈X/10⌉ presents a scaling problem because of the floating-point decimal rounding error that results in dividing X by 10. It is widely known that the binary form of 0.1 is infinitely long. A solution that meets the needs of Matrix Encryption, is to remove the last digit of X and then add 1 to the result. Doing these two operations in succession simulates taking the ceiling of X/10 without incurring any rounding error. To implement this solution, let variable_A equal the string of X. Introduce a list, List_A, and then use a For Loop to fill List_A with the characters in variable_A. Delete the last element of List_A, then join the remaining elements in List_A together forming a new variable, variable_B. Then let variable_C equal the integer conversion of variable_B plus 1. The result is that variable_C=⌈X/10⌉ See further FIG. 63).

Figure 18:
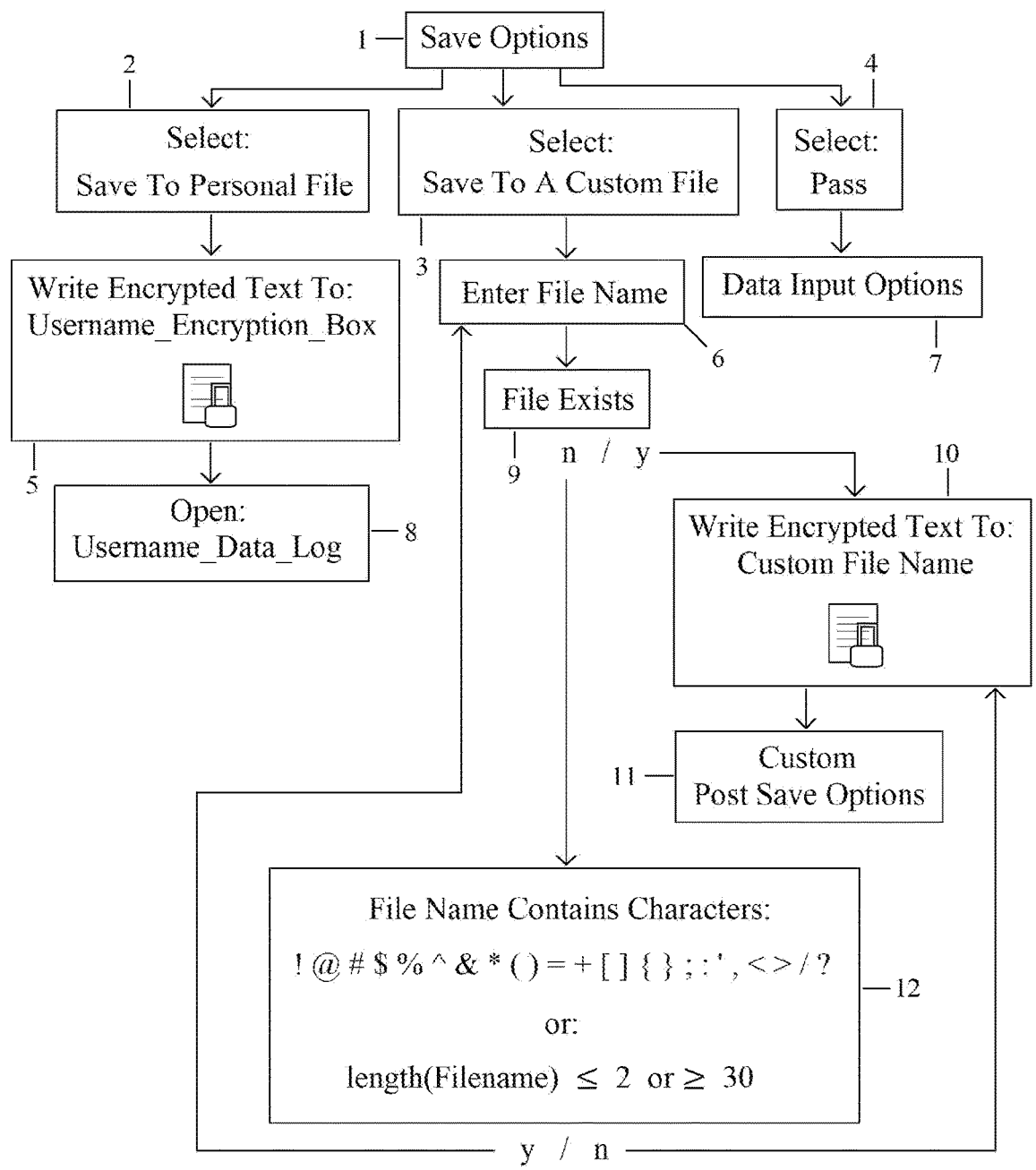
FIG. 18 shows save options after encrypting text.

FIGS. 18-1: After the Encrypted Text is obtained, the user is routed to Save Options, whereby the user is presented with 3 options, 1) Save to Personal File, 2) Save to a Custom File, and 3) Pass.

FIGS. 18-2: The user may select the 'Save to Personal File' option.

FIGS. 18-3: The user may select the 'Save to a Custom File' option.

FIGS. 18-4: The user may select the 'Pass' option.

FIGS. 18-5: Upon selecting the 'Save to Personal File' option, the Encrypted Text is written to Username_Encryption_Box.

FIGS. 18-6: Upon selecting the 'Save to a Custom File' option, the user is prompted to provide a file name to which the user would like to save the Encrypted Text.

FIGS. 18-7: Upon selecting the 'Pass' option, the user is routed back to Data Input Options.

FIGS. 18-8: After the Encrypted Text is saved to Username_Encryption_Box, the file Username_Data_Log is opened.

FIGS. 18-9: Upon providing a file name, it is determined whether the file exists. If the file exists, the Encrypted Text will be written to the specified Custom File. If the file does not exist, the file name must be checked for legality.

FIGS. 18-10: If a specified Custom File is found to exist, the Encrypted Text is written to the specified Custom File.

FIGS. 18-11: Upon the Encrypted Text being written to a pre-existent Custom File, the user is routed to Post Save Options.

FIGS. 18-12: After it has been determined that the specified Custom File does not exist, the specified File Name is checked for legality. If the File Name contains any illegal characters, it is rejected, and the user is routed back to entering the name of a Custom File. If the File Name contains fewer than 3 or greater than 29 characters the File Name will be rejected, and the user will be routed back to entering the name of a Custom File. If the specified File Name contains no illegal characters and is composed of between 3 and 29 characters, the File Name is approved and a Custom File with that name will be created and the Encrypted Text will be written to that Custom File, after which time the user will be taken to Post Save Options.

Figures 19, 20:
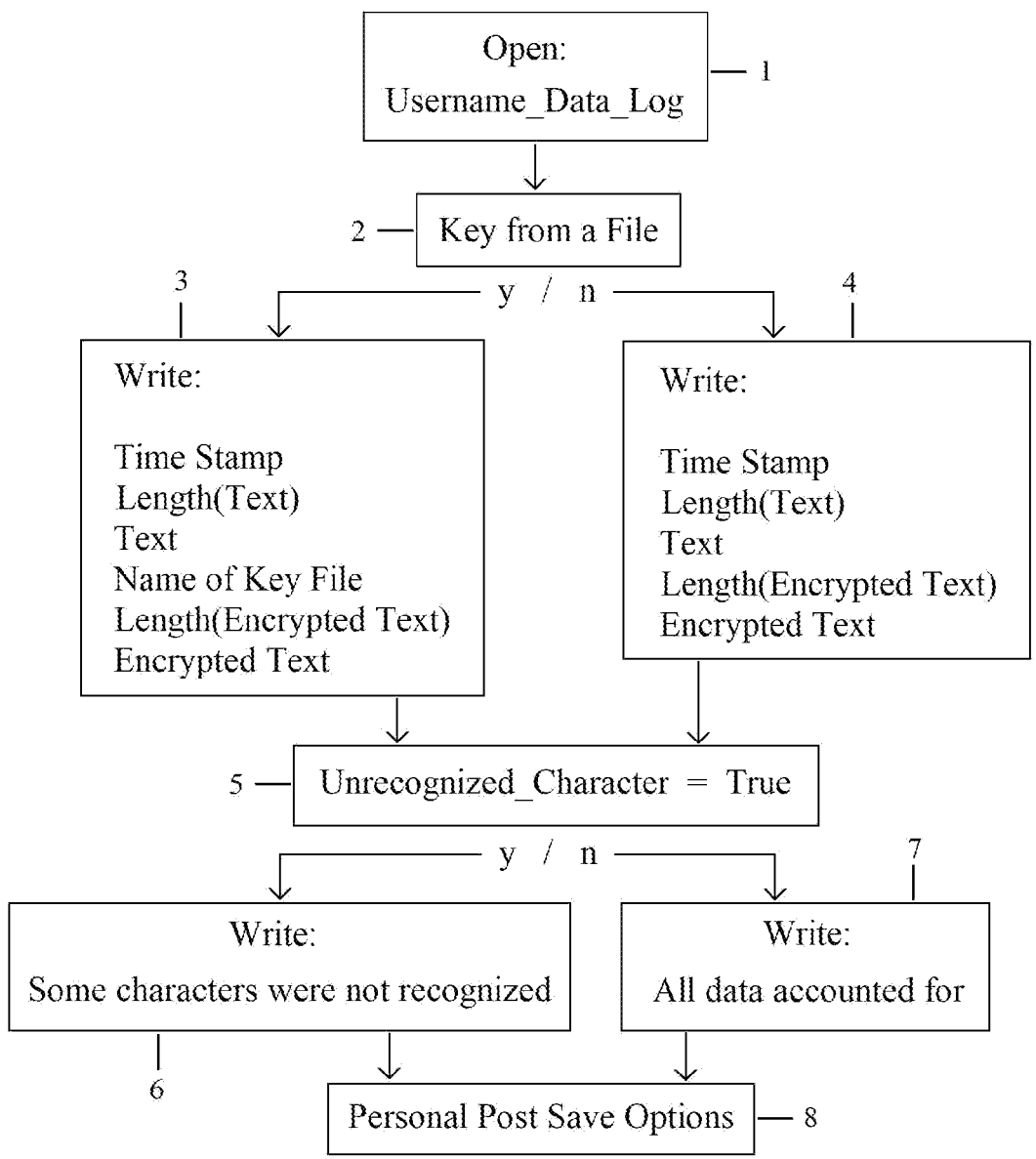
FIG. 19 shows the process of writing to the data log in the case of encryption.
FIG. 20 shows how entries in the data log are separated.

FIGS. 19-1: After the Encrypted Text is saved to Username_Encryption_Box, the file Username_Data_Log is opened.

FIGS. 19-2: After the file Username_Data_Log is opened, it is determined whether the Key used to encrypt the Encrypted Text came from a file. If the Key used came from a file, the name of the File from which the Key came will be recorded. If the Key used did not come from a file, there is no Key File Name to record to the Data Log, and the calculation is routed accordingly.

FIGS. 19-3: If the Key used to encrypt the Encrypted Text came from a file, the data transaction will be recorded by way of the following 6 data points: 1) The Time Stamp, 2) The Length of the Text, 3) The Text itself, 4) The Name of the Key File, 5) The Length of the Encrypted Text, and 6) The Encrypted Text itself.

FIGS. 19-4: If the Key used to encrypt the Encrypted Text did not come from a file, then the data transaction will be recorded by way of the following 5 data points: 1) The Time Stamp, 2) The Length of the Text, 3) The Text itself, 4) The Length of the Encrypted Text, and 5) The Encrypted Text itself.

FIGS. 19-5: Upon the appropriate data points being written to the Data Log, whether the Key used to encrypt the Encrypted Text came from a File, it must be determined if any Unrecognized Characters were encountered during encoding. If any Unrecognized Characters were encountered during encoding, as determined by checking the truth value of the global variable 'Unrecognized Character', the calculation is routed accordingly. If the variable is False, the calculation is also routed accordingly.

FIGS. 19-6: In the event that Unrecognized Characters were encountered during encoding, an additional data point is appended to the Data Log, namely that 'Some characters were not recognized.'

FIGS. 19-7: In the event that Unrecognized Characters were not encountered during encoding, an additional data point is appended to the Data Log, namely 'All data accounted for'.

FIGS. 19-8: After the Data Log has been fully appended, the user is taken to Personal Post Save Options.

FIG. 20: Data points comprising a Data Log entry are separated by a "\n" so that each data point will be written on a new line in the text file. Each entry is separated by two "\n" so that there will be an empty line separating consecutive Data Log entries.

Figures 21, 22:
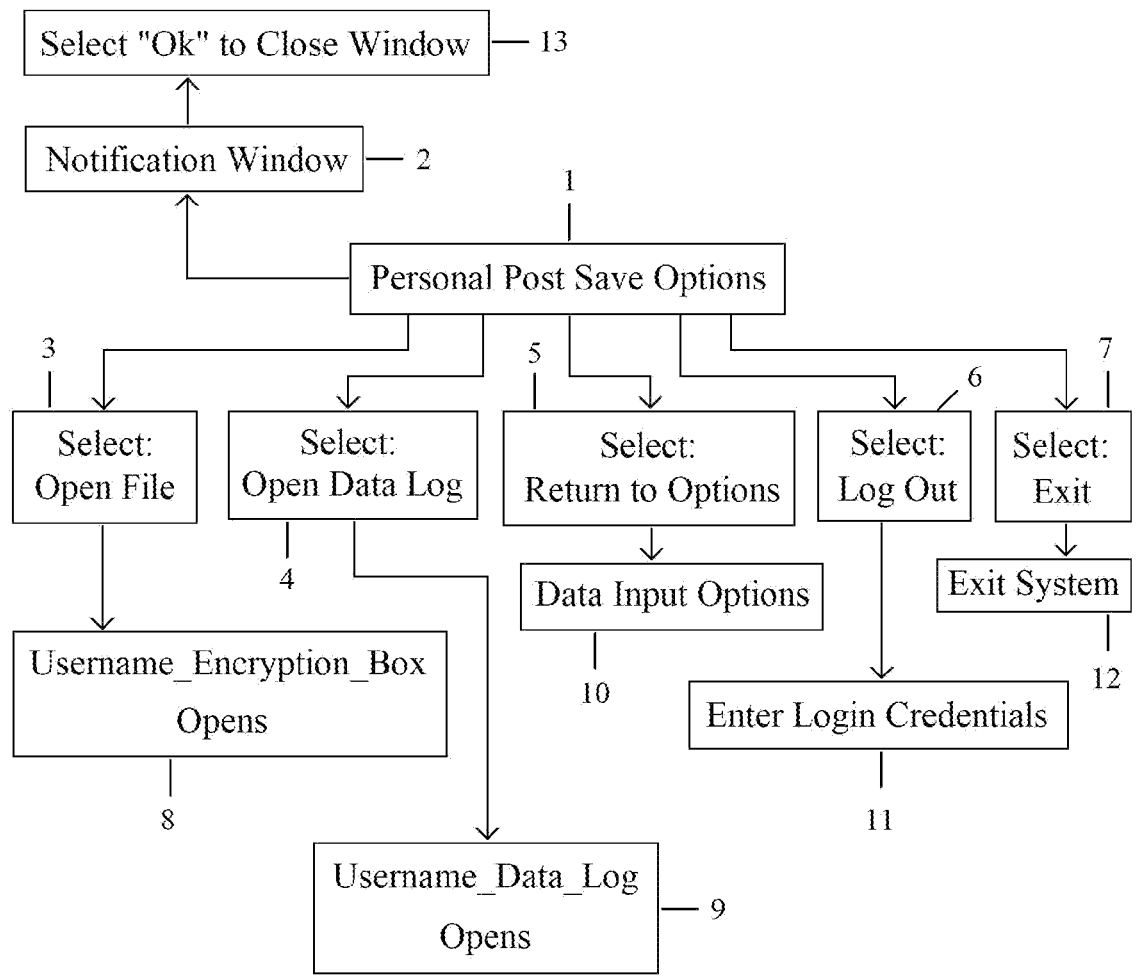
FIG. 21 shows options after a personal save.
FIG. 22 shows the notification window that appears when a personal save is done.

FIGS. 21-1: After the user's Data Log has been appended with the Data points comprising the Data Log entry, the user is routed to Personal Post Save Options, whereby the user is presented with the following 5 options: 1) Open File, 2) Open Data Log, 3) Return to Options, 4) Log Out, and 5) Exit.

FIGS. 21-2: Upon reaching Personal Post Save Options, a Notification Window appears notifying the user of the save event.

FIGS. 21-3: The user may select the 'Open File' option.

FIGS. 21-4: The user may select the 'Open Data Log' option.

FIGS. 21-5: The user may select the 'Return to Options' option.

FIGS. 21-6: The user may select the 'Log Out' option.

FIGS. 21-7: The user may select the 'Exit' option.

FIGS. 21-8: Upon clicking the 'Open File' option, the File to which the Encrypted Text was saved, opens for viewing.

FIGS. 21-9: Upon clicking the 'Open Data Log' option, the user's Data Log opens for viewing.

FIGS. 21-10: Upon selecting 'Return to Options', the user is routed to Data Input Options in order to perform another encryption.

FIGS. 21-11: Upon selecting 'Log Out', the user will be logged out, and routed to entering in Login Credentials.

FIGS. 21-12: Upon selecting 'Exit', the program will close.

FIGS. 21-13: Selecting 'Ok' on the Notification Window closes the Notification Window.

FIG. 22: The Notification Window, in the case of a Personal Save, is a window that appears as shown, displaying the name of the user's personal encryption file: Username_Encryption_Box.

Figure 23:
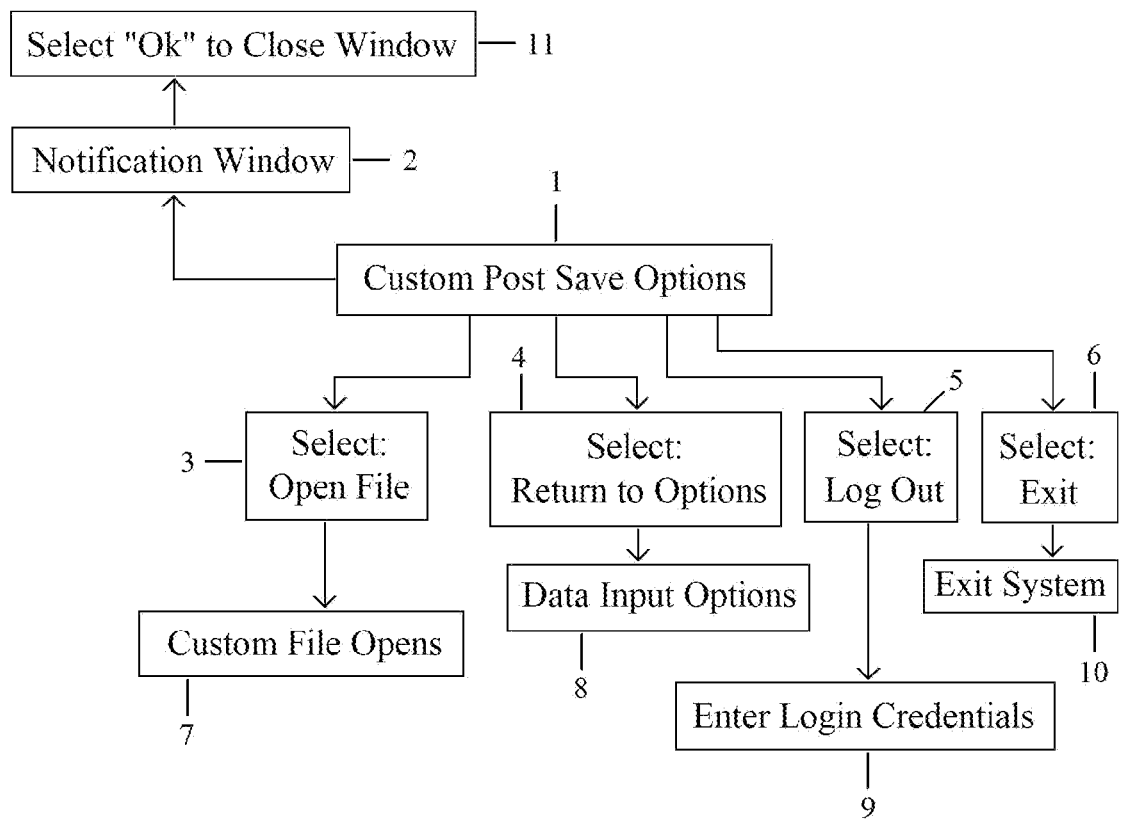
FIG. 23 shows options after a custom save.

FIGS. 23-1: Upon saving the Encrypted Text to a specified Custom File, the user is routed to Custom Post Save Options, whereupon the user is presented with 4 options: 1) 'Open File', 2) 'Return to Options', 3) 'Log Out', and 4) 'Exit'.

FIGS. 23-2: Upon reaching Custom Post Save Options, a Notification Window appears notifying the user of the save event.

FIGS. 23-3: The user may select the 'Open File' option.

FIGS. 23-4: The user may select the 'Return to Options' option.

FIGS. 23-5: The user may select the 'Log Out' option.

FIGS. 23-6: The use may select the 'Exit' option.

FIGS. 23-7: Upon selecting 'Open File', the File to which the Encrypted Text was saved, opens.

FIGS. 23-8: Upon selecting 'Return to Options', the user is routed back to Data Input Options for the purpose of executing another encryption.

FIGS. 23-9: Upon selecting 'Log Out', the use is logged out, and routed back to entering Login Credentials.

FIGS. 23-10: Upon selecting 'Exit', the program closes.

FIGS. 23-11: Selecting 'Ok' on the Notification Window closes the Notification Window.

Figure 24:
FIG. 24 shows the notification window that appears when a custom save is done.

FIG. 24: The Notification Window, in the case of a Custom Save, is a window that appears as shown, displaying the name of the Custom File to which the Encrypted Text was saved.

Figure 25:
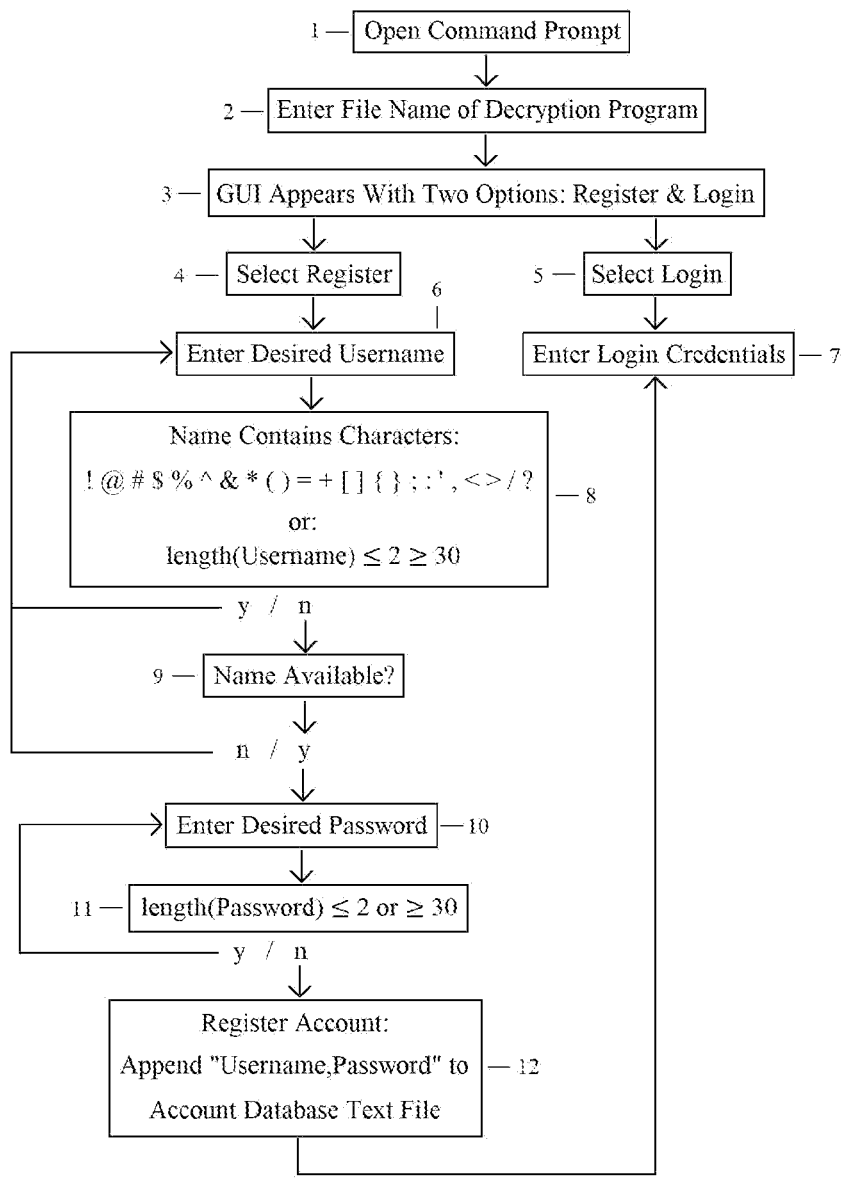
FIG. 25 shows the process of logging in and registering an account.

FIGS. 25-1: Assuming the user has already received the Matrix Encryption Startup Folder, and has successfully setup Matrix Encryption on their computer, as indicated by FIGS. 1-1, FIGS. 1-2, and FIG. 2, then the user will launch Command Prompt.

FIGS. 25-2: Next, the user will enter the name of the Python file containing the decryption program into Command Prompt and hit enter.

FIGS. 25-3: Upon correctly entering the file name, the user's computer will locate the decryption program from the user designated Python file path, and run the decryption program, at which point a GUI will appear with two options, 1) Register and 2) Login.

FIGS. 25-4: All new users will need to select the Register button in order to create an account with which to login and access program features.

FIGS. 25-5: Returning users have the option of selecting the Register button or the Login button.

FIGS. 25-6: Upon selecting the Register button, the user is prompted to enter a desired Username.

FIGS. 25-7: If a returning user selects Login, the user will be prompted to enter their Login Credentials. If a new account is successfully registered to the Account Database, the user will also be prompted to enter their Login Credentials.

FIGS. 25-8: To check legality of the desired Username, Matrix Encryption cross-references the characters in the desired Username against a list of characters deemed to be illegal because the Username must be used to generate legal text file names. If a desired Username contains inappropriate characters, the user will be routed back to entering a desired Username. If a desired Username does not contain any prohibited characters, the length of the desired Username is checked to see if the Username is too short or too long. If the desired Username is composed of fewer than 3 characters it will be rejected, and the user will be routed back to entering a desired Username. If the desired Username is greater than 29 characters in length, it will be rejected, and the user will be routed back to entering a desired Username. Finally, if a desired Username contains no illegal characters, and is between 3 and 29 characters in length, the desired Username will be deemed legal.

FIGS. 25-9: After a desired Username is deemed legal, the desired Username is checked for availability by cross-referencing the desired Username against the Account Database, which is a text file that is initially empty and present in the Matrix Encryption Startup folder. If an exact match is found between the desired Username and a Username already present in the Account Database, the user will be routed back to entering a desired Username. If no exact matches are found between the desired Username and the Usernames already present in the Account Database, the desired Username is deemed available.

FIGS. 25-10: Once a desired Username is deemed to be available, the user is prompted to enter a desired password.

FIGS. 25-11: Once a desired Password is entered, the length of the desired password is checked for appropriateness. If the desired Password contains fewer than 3 characters, it is deemed to be too short, and the user is routed back to entering a desired Password. If the desired Password contains more than 29 characters, it is deemed to be too long, and the user is likewise routed back to entering a desired Password. If a desired Password contains between 3 and 29 characters, it is approved.

FIGS. 25-12: When a desired Password is approved, the new Username and Password will be appended to the Account Database, after which point, the user is routed to Enter Login Credentials. Only the encryption program provides the option to create a Key Set after Registration (See FIGS. 1-15).

Figure 26:
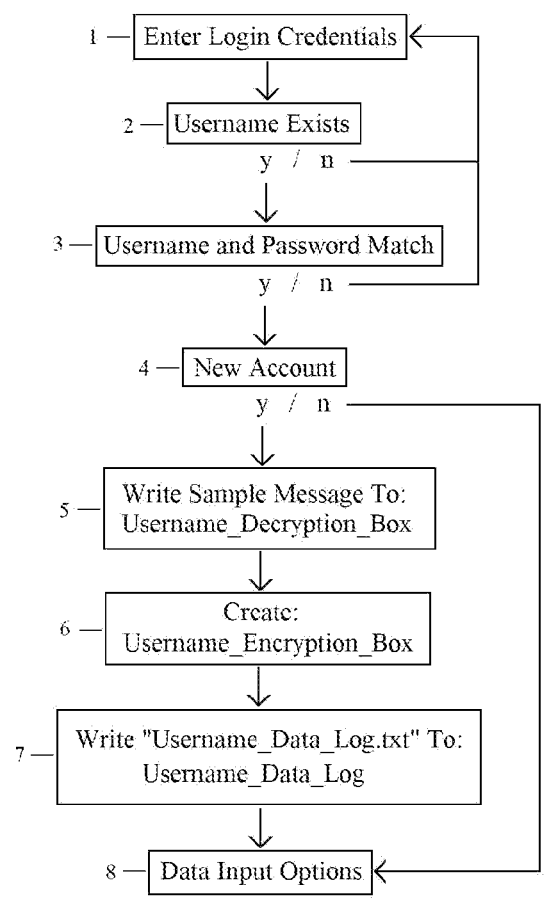
FIG. 26 shows the process of logging in and creating user files.

FIGS. 26-1: In the case of the decryption program, Login Credentials are encountered for returning users, and immediately after a new Username and Password have been successfully appended to the Account Database. There is no Key Set option as with the encryption program, so upon successful Registration, the user is routed immediately to entering Login Credentials. Upon reaching the point of entering Login Credentials, the user will enter a valid Username and Password.

FIGS. 26-2: After a Username and Password are entered, an attempt is made to locate the Username by cross-referencing it with the Account Database. If the Username entered is not found in the Database, the user will be routed back to entering in user Login Credentials. If the Username entered is found to exist, the Login Verification process continues.

FIGS. 26-3: After the Username is located, the Username and Password entered are checked against the Password on file for that Username. If the Password entered does not match the Password on file for the given Username, then the user will be routed back to entering in Login Credentials. If the Password entered matches the Password on file for the given Username, then the Login is successful.

FIGS. 26-4: Upon successful Login, it is determined whether the Account is newly registered. If the account is new, the user proceeds to User File Creation. If the account is not new, the user will bypass User File creation, and be routed to Data Input Options.

FIGS. 26-5: Upon successfully logging in, being a newly registered account will prompt the creation of a personal decryption text file named as follows: Username_Decryption_Box. The following Sample Message is written to the personal decryption file:

Welcome to your Decryption Box. This is your 161-character sample message. It requires a 322-digit key to encrypt. Your Personal Encryption Box is created empty.

FIGS. 26-6: After the personal decryption file is created, the personal encryption file is created. The personal encryption file is named: Username_Encryption_Box. The personal encryption file is created empty.

FIGS. 26-7: After the personal encryption file is created, the user's Data Log file is created with the contents 'Username_Data_Log.txt' being written to the Data Log. Thus, the creation of new user files is concluded.

FIGS. 26-8: After the creation of new user files is concluded, the user is routed to Data Input Options.

FIGS. 27-1: After successfully logging in and/or creating user files, the user comes to Data Input Options for the decryption program, whereby the user is presented with 2 options: 1) Decrypt Your Personal File, and 2) Enter Custom File Name.

FIGS. 27-2: The user may select the 'Decrypt Your Personal File' option.

FIGS. 27-3: The user may select the 'Enter Custom File Name' option.

FIGS. 27-4: Upon selecting 'Decrypt Your Personal File', the file Username_Encryption_Box is presumed to exist, and the calculation routes to retrieving the contents of Username_Encryption_Box.

FIGS. 27-5: Upon selecting 'Enter Custom File Name', the user is prompted to enter the name of a Custom File which the user would like to decrypt.

FIGS. 27-6: Upon providing a Custom File Name, it is determined whether the Custom File exists. If the specified Custom File does not exist, the user is routed back to entering in the name of a Custom Encryption File. If the specified Custom File exists, the calculation proceeds to measuring the contents of the specified Custom File.

FIGS. 27-7: File contents originating from either Username_Encryption_Box or a Custom File are measured, and then routed based on appropriateness.

FIGS. 27-8: If the File Contents are shorter than 322 characters in length, the File will be rejected, and the user will be routed back to Data Input Options. If the Contents are not an integer, the Contents are deemed inappropriate by ValueError, and the user is routed back to Data Input Options. If the File Contents are determined to be an integer at least 322 digits in length, the calculation proceeds.

FIGS. 27-9: Once the File contents are deemed appropriate, the File Contents become the Encrypted Text.

FIGS. 27-10: Once the Encrypted Text is obtained, the length of the Encrypted Text is checked to determine whether the length of the Encrypted Text is odd or even. If an Encrypted Text with an odd number of digits is encountered, it will generally indicate user error in altering the Encrypted Text as originally encrypted. In such a case, the user will be routed to Proceed Options. Barring any such error, the Encrypted Text, which by all rights should have an even number of digits, is approved, and the user is routed to Key Input Options.

FIGS. 27-11: In the event that Encrypted Text with an odd number of digits is encountered, the user is routed to Proceed Options, whereby the user is presented with 2 options: 1) Yes, and 2) No.

FIGS. 27-12: After File Contents are determined to be an integer at least 322 digits in length with an even number of digits, the calculation routes to Key Input Options.

FIGS. 27-13: In the event that Proceed Options are encountered, selecting 'Yes' routes the user to Key Input Options. In this case, the user should not expect any readable Text from the process of decryption.

FIGS. 27-14: In the event that Proceed Options are encountered, selecting 'No' routes the user back to Data Input Options. This is the more likely scenario, as it is more likely that some digit or digits are missing from the Encrypted Text, and the user wishes to try again, as opposed to the user intentionally desiring to decrypt Encrypted Text that is composed of an odd number of digits, however the options to do either are given.

FIG. 28: File Contents are measured by determining whether the length of the File Contents is greater than or equal to 322 digits.

FIG. 29: To determine whether Encrypted Text contains an odd number of digits, it is sufficient to take the length of the Encrypted Text and check whether the last digit of the length is a 1, 3, 5, 7, or 9. If the last digit of the length of an Encrypted Text is found to be a 1, 3, 5, 7, or 9, then the Encrypted Text is determined to have an odd number of digits. If the last digit of the length of an Encrypted Text is not found to be a 1, 3, 5, 7, or 9, then the Encrypted Text is deduced to contain an even number of digits.

Figures 30, 31, 32:
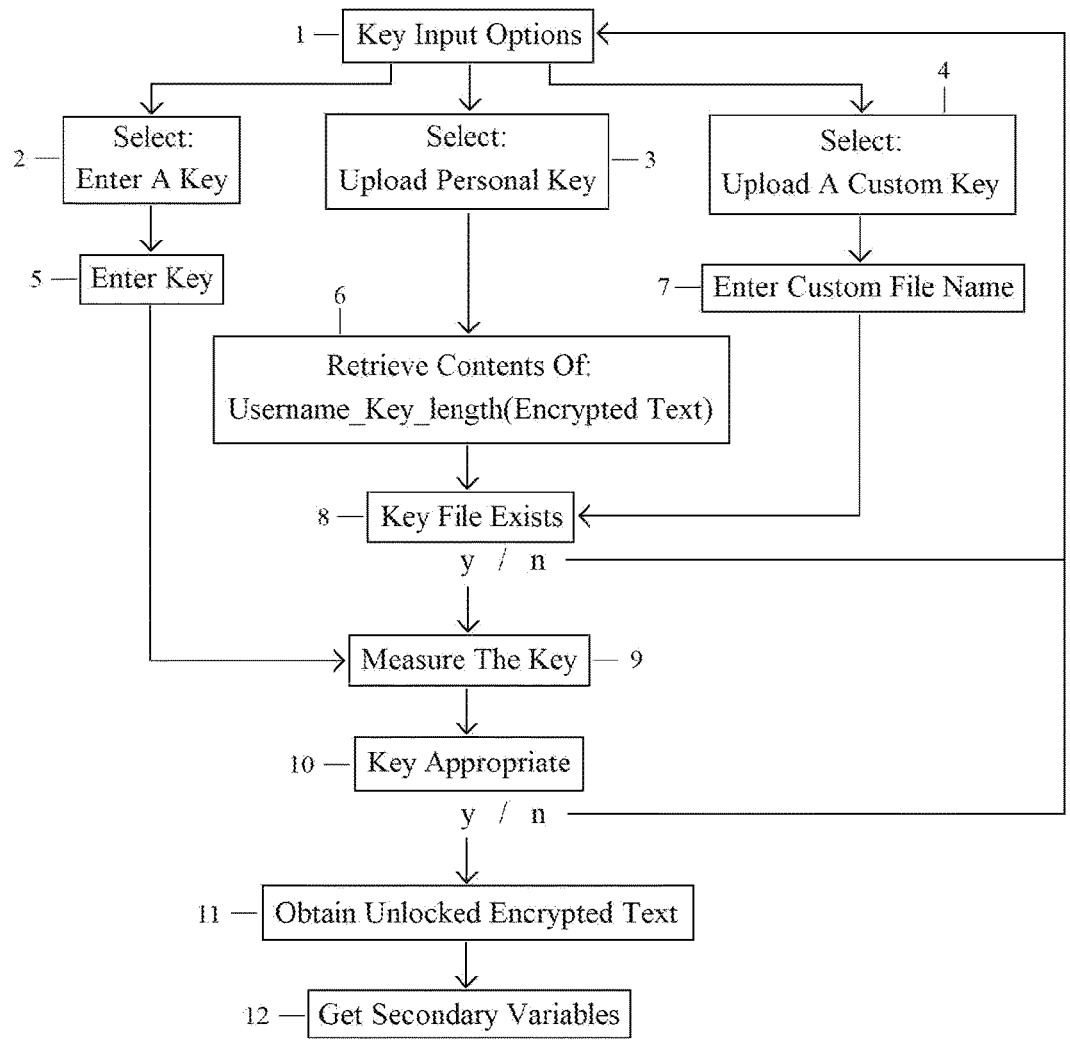
FIG. 30 shows key input options and the processing of a key.
FIG. 31 shows the measurement standard for a key.
FIG. 32 shows how the unlocked encrypted text is obtained from the encrypted text and a key.

FIGS. 30-1: After the Encrypted Text is determined to contain an even number of digits, or after the user elects to proceed with an Encrypted Text containing an odd number of digits, the user is routed to Key Input Options, wherefrom the user is presented with 3 options: 1) Enter a Key, 2) Upload Personal Key, and 3) Upload a Custom.

FIGS. 30-2: The user may select the 'Enter a Key' option.

FIGS. 30-3: The user may select the 'Upload Personal Key' option.

FIGS. 30-4: The user may select the 'Upload a Custom Key' option.

FIGS. 30-5: Upon selecting 'Enter a Key', the user is prompted to enter a Key.

FIGS. 30-6: Upon selecting 'Upload Personal Key', the program will attempt to retrieve the contents of Username_Key_length(Encrypted Text). For instance, if a user's Username is Zelda, and the Encrypted Text is 1000 digits in length, Matrix Encryption will attempt to open Zelda_Key_1000.txt.

FIGS. 30-7: Upon selecting 'Upload a Custom Key', the user is prompted to enter the name of a Custom File from which the user would like to upload a Key.

FIGS. 30-8: Whether coming from the 'Upload Personal Key' option or from the 'Upload a Custom Key' option, from here Matrix Encryption will determined whether the File exists. If the File is not found, the user will be routed back to Key Input Options. If the File is found to exist, the calculation proceeds.

FIGS. 30-9: After a File is found to exist, or after a Key is entered, the data provided is measured.

FIGS. 30-10: After the Contents are measured, a determination is made regarding the appropriateness of the Contents. If the Contents are found to be an integer of appropriate size, the calculation proceeds. If the Contents are found to be an integer that is either too small or too large, the Contents are rejected, and the user is routed back to Key Input Options. If the Contents are found to be anything other than an integer, a ValueError is triggered, which routes the user back to Key Input Options.

FIGS. 30-11: After a Key is deemed to be appropriate, the Unlocked Encrypted Text is calculated and obtained, and the calculation proceeds.

FIGS. 30-12: After the Unlocked Encrypted Text has been obtained, the calculation proceeds to Get Secondary Variables.

FIG. 31: As with the encryption program, a Key must be measured based on the number of digits it contains. With V=length(Encrypted Text), the lower bound of Key size becomes:

$$10^{V-1} < Key$$

This again is the smallest integer with a given number of digits V. Unlike the encryption program however, the upper bound of Key size in the decryption program is not measure against the Compliment of the Encoded Text, because the Encoded Text is not known at this stage of the calculation. Using the Complement of the Encrypted Text would change the original range by which the Key was measured during encrypting. In general:

$$\text{Encrypted Text} > \text{Encoded Text}$$

Therefore, in general the opposite is true of the Compliments:

$$(10^V - \text{Encoded Text}) > (10^V - \text{Encrypted Text})$$

The result of this, is that if $(10^V-\text{Encrypted Text})$ were to be used as the upper bound for Key size during decrypting, it becomes possible that a particular Key used to generate some Encrypted Text with the encryption program, will be found to be too large to decrypt the Encrypted Text by the decryption program, even though it is in fact the correct Key. That is, the following scenario becomes possible:

$$(10^V - \text{Encoded Text}) > Key_{correct} > (10^V - \text{Encrypted Text})$$

The resolution is simply to raise the upper bound of Key size to $10^V$ and require that a Key be strictly less than $10^V$ during decrypting. This ensures that any Key used to generate Encrypted Text, will never be found to be too large to decrypt that Encrypted Text:

$$10^V > (10^V - \text{Encoded Text}) > Key_{correct}$$

Finally, we can write the Key measurement standard for approving Keys to be appropriate for the decryption program as:

$$10^{V-1} < Key < 10^V$$

And as stated, if a Key is larger or smaller than allowed, the user is routed back to Key Input Options.

FIG. 32: The Unlocked Encrypted Text is obtained by subtracting the approved Key from the Encrypted Text in the following way:

Let Unlocked Encrypted Text=x, then $$x = \text{Encrypted Text} - (Key - \lfloor Key/10 \rfloor)$$

To implement $\lfloor Key/10 \rfloor$, the scaling technique outlined at FIG. 16 is used, with the only substantive difference being that for the floor function, 1 is not added as it is in dealing with the ceiling function.

FIGS. 33-1: After the Unlocked Encrypted Text is obtained, the calculation proceeds to Get Secondary Variables.

FIGS. 33-2: After Secondary Variables have been obtained, the Encoded Text is recovered by executing CBDI-Mod FIGS. 33-3: After the Encoded Text is recovered, the calculation proceeds to decode the Encoded Text.

FIG. 34: The process of obtaining Secondary Variables in the decryption program is similar to the process outlined in FIG. 15 for obtaining Secondary Variables in the encryption program. The equations for Z and z are the same, but the equation for R though valid is not used, because CBDI-Mod does not use R. Also, instead of using 2*length(Text), the length of the Unlocked Encrypted Text (i.e., length(x)) is used, which is quantitatively the same value:

Unlocked Encrypted Text=x $$\text{length}(x) = Y$$

$$Z = 10^Y - 1$$

$$z = 10^Y + 1$$

FIG. 35: The Modified Inverse Combinatorial Batch Decimation Function (CBDI-Mod) is defined for the Secondary Variables Z and z, together with the Unlocked Encrypted Text x, and renders f(x) (i.e., the Encoded Text) as follows:

$$f(x)=Z-(\lfloor(z-x)/9\rfloor+z-x)$$

FIG. 36: As with the operations $\lceil X/10\rceil$ and $\lfloor Key/10\rfloor$, the necessity to divide by 9 in executing CBDI-Mod presents a unique scaling problem. The goal is to minimize rounding error. Starting with an integer N, the solution in concept is to arrive at N/9 via the sum of two terms. The first term approximates the true value of N/9 without going over. The second term makes up the difference between the first term and the true value of N/9.

Such a first term can be calculated using the 'Trimmed Sum of N'. The Trimmed Sum is the process of recursively removing the last digit of N and storing the value for summation until no digits remain, and then taking the sum of all the trimmed values. For example, if N=1234, Trimmed Sum(N)=123+12+1=136.

Such a second term can be calculated using the Digit Sum of N divided by 9. The Digit Sum of a number is the process of adding all the digits together. Digit Sum(1234)=1+2+3+4=10. Dividing the Digit Sum by 9 in this example, gives: 10/9=1.11, and then, adding the Trimmed Sum(N) to the Digit Sum(N)/9, we have 136+1.11=137.11 which is the true value of 1234/9, thus we can write the general equality:

$$N/9=\text{Trimmed Sum}(N)+\text{Digit Sum}(N)/9$$

See FIG. 64 for a calculation of the rounding error limit in Bytes obtained for the decryption program via this method.

FIG. 37: To implement the scaling solution for executing:

$$\lfloor(z-x)/9\rfloor$$

efficiently, first create two empty Lists, L3 and L4. The value (z−x) becomes a variable, call it 'variable00'. Since a string is required instead of an integer, 'variable0' becomes the string version of variable00. Use a while loop that says that while the length of variable0 is greater than 1, remove the last character of variable0 then append variable0 to L3. Fill L4 using a for loop, appending all characters composing variable0 into L4. Next, use a for loop that ranges from 0 up to the length of L3. For each element e in the range, the corresponding element in L3 (i.e., int(L3[e])) will be retrieved and added to the variable 'variable1'. Variable1 is effectively the Trimmed Sum of (z−x).

Next, use a for loop that ranges from 0 up to the length of L4. For each element f in the range, the corresponding element in L4 (i.e., int(L4[f])) will be retrieved and added to the variable 'variable2'.

Let 'g' be a variable representing the division of variable2 by 9, then let 'h' be a variable representing taking the floor of g. Finally, let 'variable3' equal the sum of variable1 and h. Variable3 has the desired value:

$$\text{variable3}=\lfloor(z-x)/9\rfloor$$

Figure 38:
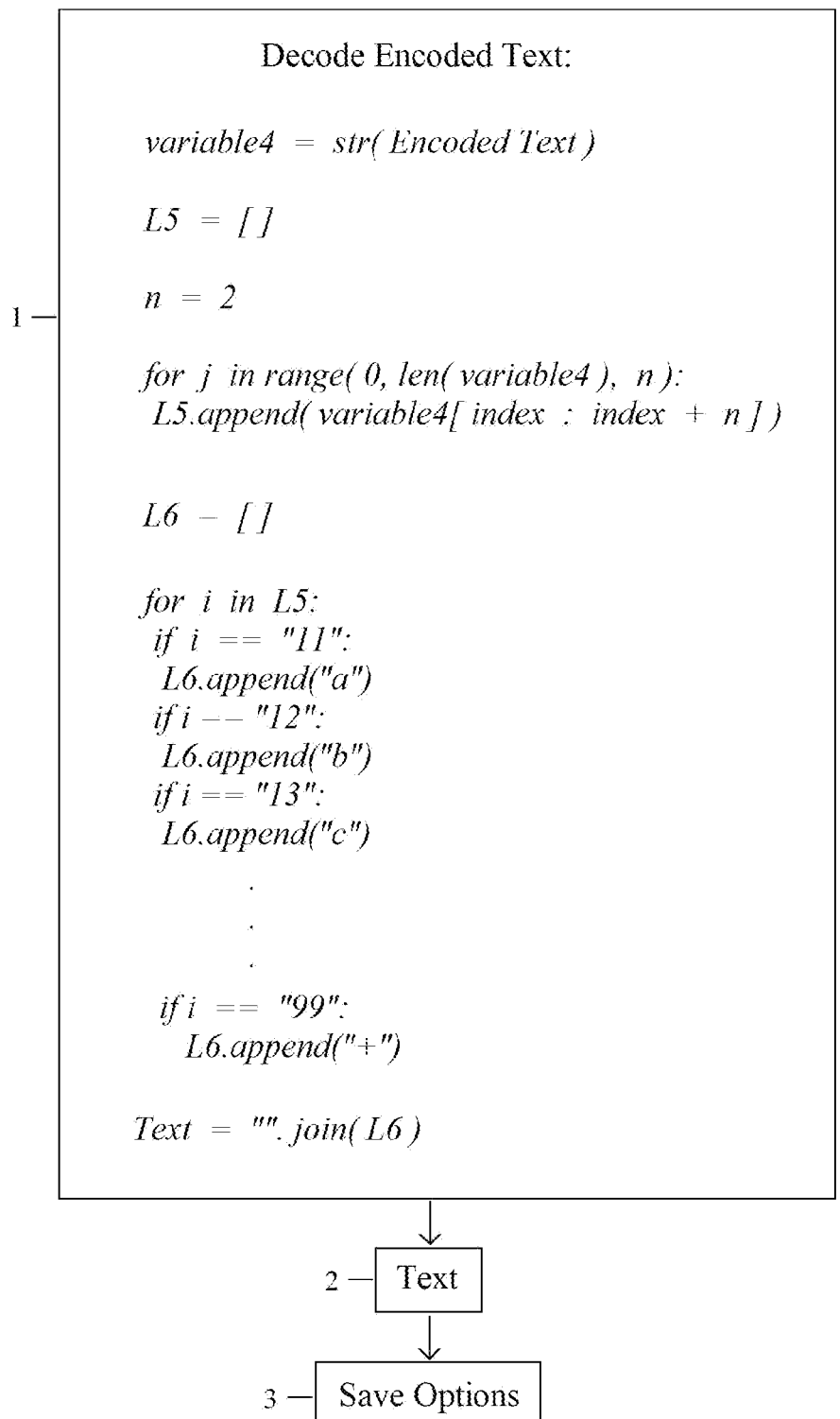
FIG. 38 shows explicitly the code for obtaining the original text from the encoded text.

FIGS. 38-1: Once the CBDI-Mod calculations are finished and the Encoded Text is obtained, the Encoded Text must be decoded. The decoding operation is the inverse of the encoding operation. The encoding operation takes single characters and encodes them into 2-digit integers, the decoding operation must take 2-digits at a time and decode them into single characters.

Let 'variable4' equal the string conversion of the Encoded Text, create an empty List L5, and let the variable 'n' equal 2.

Use a for loop that ranges from 0 up to the length of variable4, with respect to n as an index marker. For each element j in the range, append the two digits in variable4 that occur at j to L5.

Create the empty List L6. Then use a for loop and say that for i in L5, if i is found to equal a given 2-digit value, append a predetermined character to L6. Fill out the for loop using identical character assignments to those used in the encryption program and as appearing on the Cipher Chart.

The code for Unrecognized Characters is not used. Finally, the resulting elements in L6 are joined, resulting in the Text.

FIGS. 38-2: The original Text, exactly as it appeared prior to encoding is also the result of decoding.

FIGS. 38-3: After the Text is obtained, the user is routed to Save Options.

Figure 39:
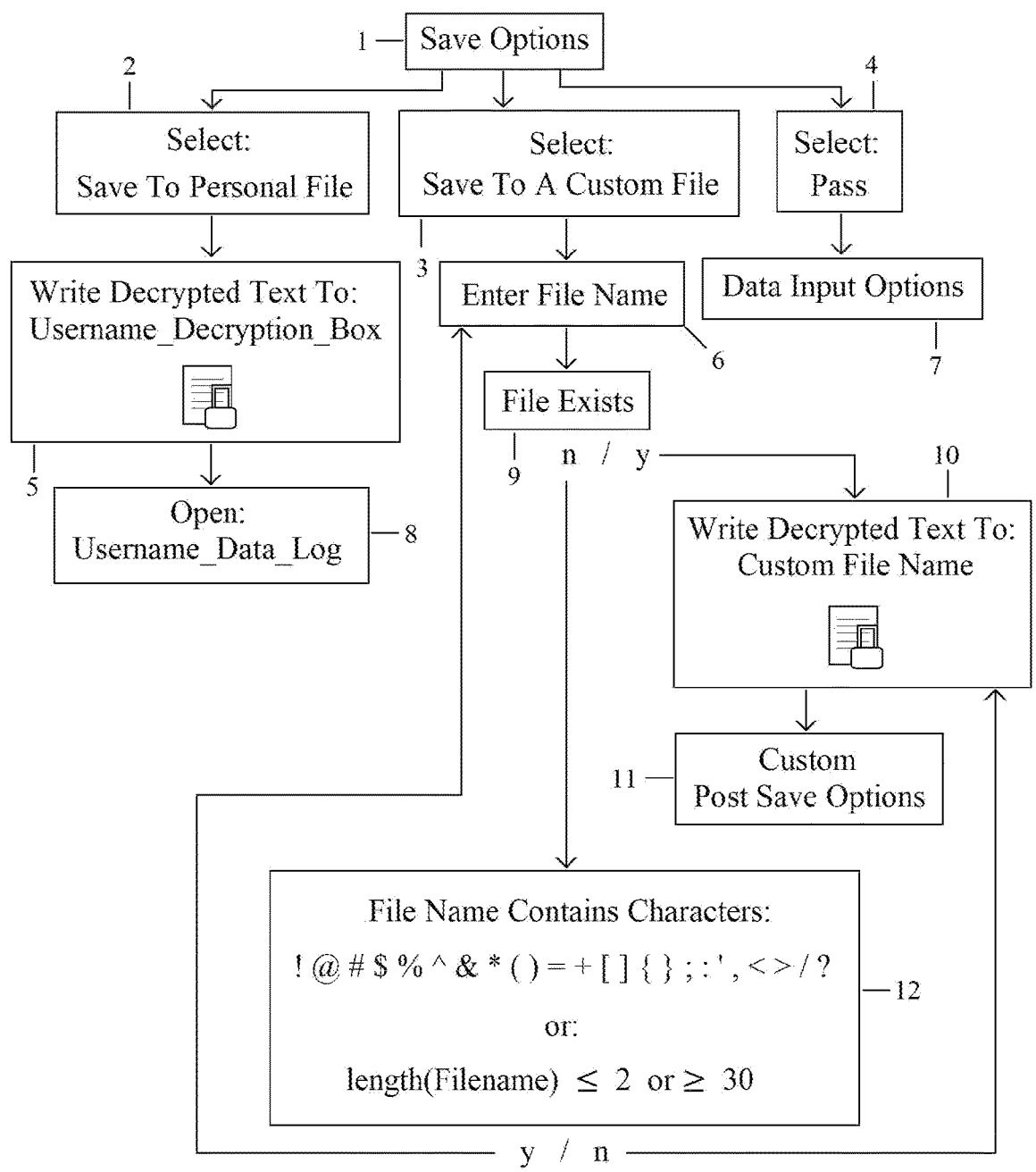
FIG. 39 shows save options after decrypting text.

FIGS. 39-1: After the Text is obtained, the user is routed to Save Options, whereby the user is presented with 3 options, 1) Save to Personal File, 2) Save to a Custom File, and 3) Pass.

FIGS. 39-2: The user may select the 'Save to Personal File' option.

FIGS. 39-3: The user may select the 'Save to a Custom File' option.

FIGS. 39-4: The user may select the 'Pass' option.

FIGS. 39-5: Upon selecting the 'Save to Personal File' option, the Text is written to Username_Decryption_Box.

FIGS. 39-6: Upon selecting the 'Save to a Custom File' option, the user is prompted to provide a file name to which the user would like to save the Text.

FIGS. 39-7: Upon selecting the 'Pass' option, the user is routed back to Data Input Options.

FIGS. 39-8: After the Text is saved to Username_Decryption_Box, the file Username_Data_Log is opened.

FIGS. 39-9: Upon providing a file name, it is determined whether the file exists. If the file exists, the Text will be written to the specified Custom File. If the file does not exist, the file name must be checked for legality.

FIGS. 39-10: If a specified Custom File is found to exist, the Text is written to the specified Custom File.

FIGS. 39-11: Upon the Text being written to a pre-existent Custom File, the user is routed to Post Save Options.

FIGS. 39-12: After it has been determined that the specified Custom File does not exist, the specified File Name is checked for legality. If the File Name contains any illegal characters, it is rejected, and the user is routed back to entering the name of a Custom File. If the File Name contains fewer than 3 or greater than 29 characters the File Name will be rejected, and the user will be routed back to entering the name of a Custom File. If the specified File Name contains no illegal characters and is composed of between 3 and 29 characters, the File Name is approved and a Custom File with that name will be created and the Text will be written to that Custom File, after which time the user will be taken to Post Save Options.

Figures 40, 41:
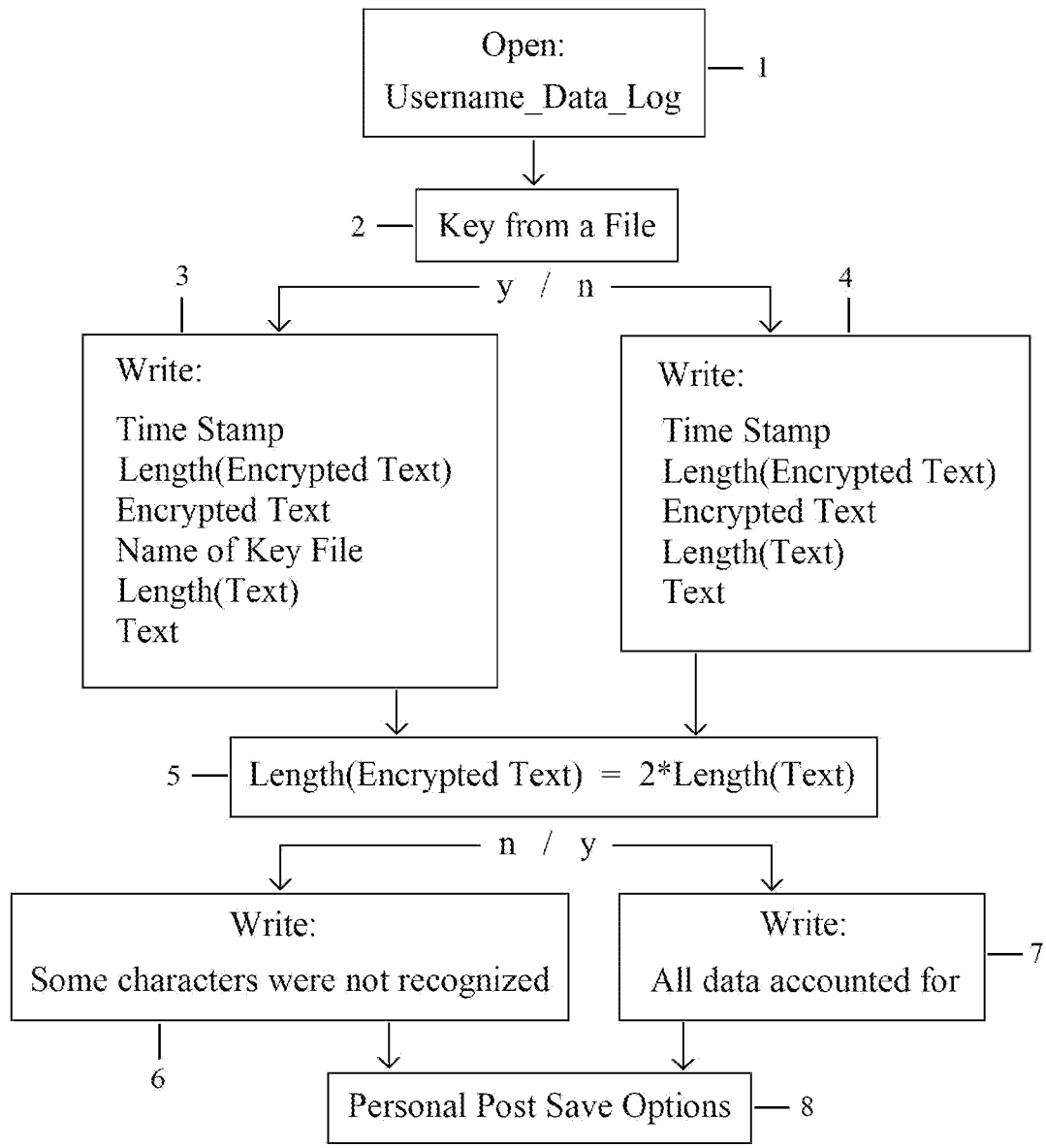
FIG. 40 shows the process of writing to the data log in the case of decryption.
FIG. 41 shows how entries in the data log are separated.

FIGS. 40-1: After the Text is saved to Username_Decryption_Box, the file Username_Data_Log is opened.

FIGS. 40-2: After the file Username_Data_Log is opened, it is determined whether the Key used to decrypt the Text came from a file. If the Key used came from a file, the name of the File from which the Key came will be recorded. If the Key used did not come from a file, there is no Key File Name to record to the Data Log, and the calculation is routed accordingly.

FIGS. 40-3: If the Key used to decrypt the Text came from a file, the data transaction will be recorded by way of the following 6 data points: 1) The Time Stamp, 2) The Length of the Encrypted Text, 3) The Encrypted Text itself, 4) The Name of the Key File, 5) The Length of the Text, and 6) The Text itself.

FIGS. 40-4: If the Key used to decrypt the Text did not come from a file, then the data transaction will be recorded by way of the following 5 data points: 1) The Time Stamp, 2) The Length of the Encrypted Text, 3) The Encrypted Text itself, 4) The Length of the Text, and 5) The Text itself.

FIGS. 40-5: Upon the appropriate data points being written to the Data Log, whether the Key used to decrypt the Text came from a File, it must be determined if any Unrecognized Characters were encountered. In the decryption program, Unrecognized Characters are detected by checking to see that the length of the Encrypted Text is exactly equal to twice the length of the Text. Any deviation from this indicates Unrecognized Characters—a typical result of decrypting with the wrong Key. If any Unrecognized Characters are encountered, the calculation is routed accordingly, and if no Unrecognized Characters are detected, the calculation is also routed accordingly.

FIGS. 40-6: In the event that Unrecognized Characters are encountered during encoding, an additional data point is appended to the Data Log, namely that 'Some characters were not recognized.'

FIGS. 40-7: In the event that Unrecognized Characters are not encountered, an additional data point is appended to the Data Log, namely 'All data accounted for'.

FIGS. 40-8: After the Data Log has been fully appended, the user is taken to Personal Post Save Options.

FIG. 41: Data points comprising a Data Log entry are separated by a "\n" so that each data point will be written on a new line in the text file. Each entry is separated by two "\n" so that there will be an empty line separating consecutive Data Log entries.

Figure 42:
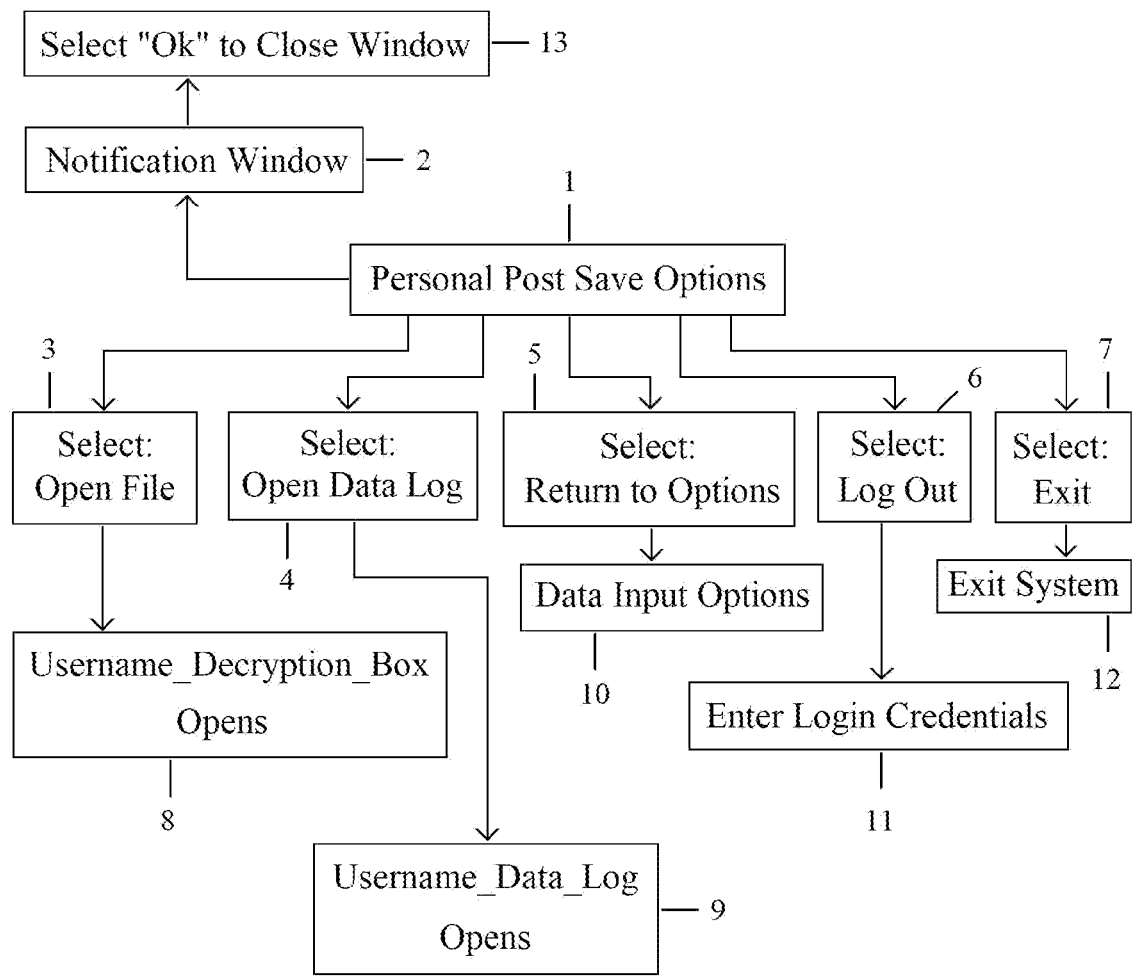
FIG. 42 shows options after a personal save.

FIGS. 42-1: After the user's Data Log has been appended with the Data points comprising the Data Log entry, the user is routed to Personal Post Save Options, whereby the user is presented with the following 5 options: 1) Open File, 2) Open Data Log, 3) Return to Options, 4) Log Out, and 5) Exit.

FIGS. 42-2: Upon reaching Personal Post Save Options, a Notification Window appears notifying the user of the save event.

FIGS. 42-3: The user may select the 'Open File' option.

FIGS. 42-4: The user may select the 'Open Data Log' option.

FIGS. 42-5: The user may select the 'Return to Options' option.

FIGS. 42-6: The user may select the 'Log Out' option.

FIGS. 42-7: The user may select the 'Exit' option.

FIGS. 42-8: Upon clicking the 'Open File' option, the File to which the Text was saved, opens for viewing.

FIGS. 42-9: Upon clicking the 'Open Data Log' option, the user's Data Log opens for viewing.

FIGS. 42-10: Upon selecting 'Return to Options', the user is routed to Data Input Options in order to perform another decryption.

FIGS. 42-11: Upon selecting 'Log Out', the user will be logged out, and routed to entering in Login Credentials.

FIGS. 42-12: Upon selecting 'Exit', the program will close.

FIGS. 42-13: Selecting 'Ok' on the Notification Window closes the Notification Window.

Figure 43:
FIG. 43 shows the notification window that appears when a personal save is done.

FIG. 43: The Notification Window, in the case of a Personal Save, is a window that appears as shown, displaying the name of the user's personal decryption file: Username_Decryption_Box.

Figure 44:
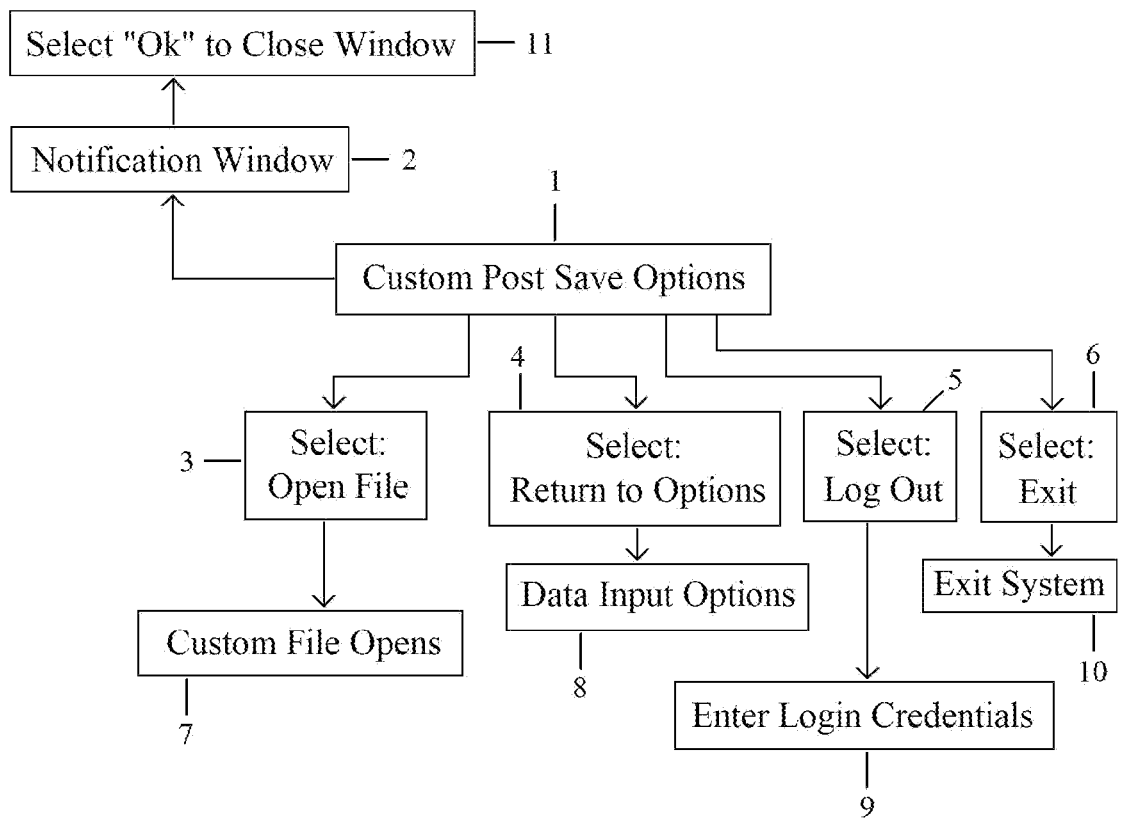
FIG. 44 shows options after a custom save.

FIGS. 44-1: Upon saving the Text to a specified Custom File, the user is routed to Custom Post Save Options, whereupon the user is presented with 4 options: 1) 'Open File', 2) 'Return to Options', 3) 'Log Out', and 4) 'Exit'.

FIGS. 44-2: Upon reaching Custom Post Save Options, a Notification Window appears notifying the user of the save event.

FIGS. 44-3: The user may select the 'Open File' option.

FIGS. 44-4: The user may select the 'Return to Options' option.

FIGS. 44-5: The user may select the 'Log Out' option.

FIGS. 44-6: The use may select the 'Exit' option.

FIGS. 44-7: Upon selecting 'Open File', the File to which the Text was saved, opens.

FIGS. 44-8: Upon selecting 'Return to Options', the user is routed back to Data Input Options for the purpose of executing another decryption.

FIGS. 44-9: Upon selecting 'Log Out', the use is logged out, and routed back to entering Login Credentials.

FIGS. 44-10: Upon selecting 'Exit', the program closes.

FIGS. 44-11: Selecting 'Ok' on the Notification Window closes the Notification Window.

Figure 45:
FIG. 45 shows the notification window that appears when a custom save is done.

FIG. 45: The Notification Window, in the case of a Custom Save, is a window that appears as shown, displaying the name of the Custom File to which the Text was saved.

Figure 46:
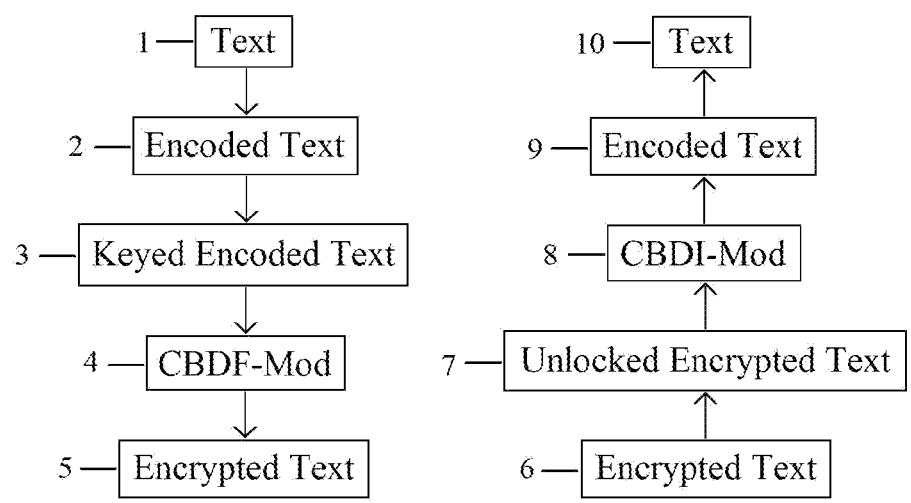
FIG. 46 shows an overview of how data is processed.

FIGS. 46-1: Text is the primary object of Matrix Encryption. To protect the contents and the meaning of Text is the primary objective of Matrix Encryption. Text is taken as the first input in the encryption program and the calculation proceeds.

FIGS. 46-2: Text is received and converted to Encoded Text.

FIGS. 46-3: The Encoded Text is combined with a Key to produce the Keyed Encoded Text.

FIGS. 46-4: The Keyed Encoded Text is used as the primary variable in CBDF-Mod.

FIGS. 46-5: The Encrypted Text is the result of performing CBDF-Mod on the Keyed Encoded Text.

FIGS. 46-6: In the case of the decryption program, the input is the Encrypted Text. Some Encrypted Text is provided and the calculation proceeds.

FIGS. 46-7: The Encrypted Text is converted into the Unlocked Encrypted Text by subtracting the correct Key from the Encrypted Text.

FIGS. 46-8: The Unlocked Encrypted Text is used as the primary variable in CBDI-Mod.

FIGS. 46-9: The Encoded Text is the result of performing CBDI-Mod on the Unlocked Encrypted Text.

FIGS. 46-10: The Encoded Text is then decoded resulting in the original Text.

Figure 47:
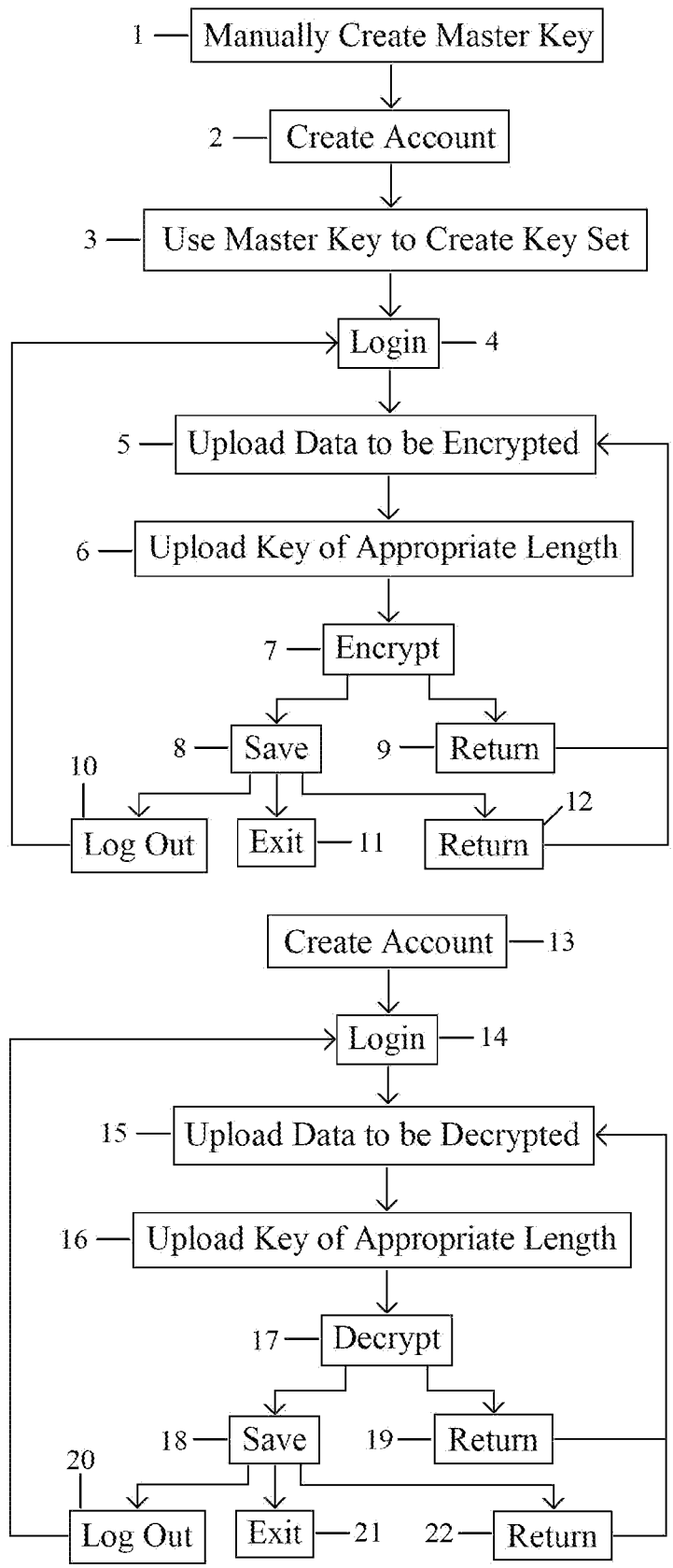
FIG. 47 shows an overview of program structure.

FIGS. 47-1: A new user manually creates a Master Key.

FIGS. 47-2: After creating a Master Key, an Account is created.

FIGS. 47-3: After an Account is created, the user may create a

Key Set using their Master Key.

FIGS. 47-4: After passing Key Set options, the user will login in.

FIGS. 47-5: After successfully logging in, the user will upload data to be encrypted.

FIGS. 47-6: After data to be encrypted is successfully uploaded the user will upload a Key.

FIGS. 47-7: After an appropriate Key has been uploaded the Encrypted Text will be obtained.

FIGS. 47-8: After the Encrypted Text is obtained, the user has the option to save.

FIGS. 47-9: After the Encrypted Text is obtained, the user has the option to return to the point of inputting data to be encrypted.

FIGS. 47-10: After saving Encrypted Text, the user may log out and return to the point of logging in.

FIGS. 47-11: After saving Encrypted Text, the user may exit the program.

FIGS. 47-12: After saving Encrypted Text, the user may return to the point of inputting data to be encrypted.

FIGS. 47-13: In the case of the decryption program, there is no Key Set option, and a new user will first create a new Account.

FIGS. 47-14: After a new user creates an Account, the user will login.

FIGS. 47-15: After logging in, the user will upload Encrypted Text to be decrypted.

FIGS. 47-16: After uploading Encrypted Text to be decrypted, the user will upload the correct Key used to encrypt the Text.

FIGS. 47-17: After the correct Key used to encrypt the Text has been uploaded, the original Text will be recovered and obtained.

FIGS. 47-18: After the original Text has been obtained the user has the option to save.

FIGS. 47-19: After the original Text has been obtained the user has the option to return to the point of inputting Encrypted Text to be decrypted.

FIGS. 47-20: After saving Encrypted Text, the user may log out and return to the point of logging in.

FIGS. 47-21: After saving Encrypted Text, the user may exit the program.

FIGS. 47-22: After saving Encrypted Text, the user may return to the point of inputting Encrypted Text to be decrypted.

Figures 48, 49, 50, 51:
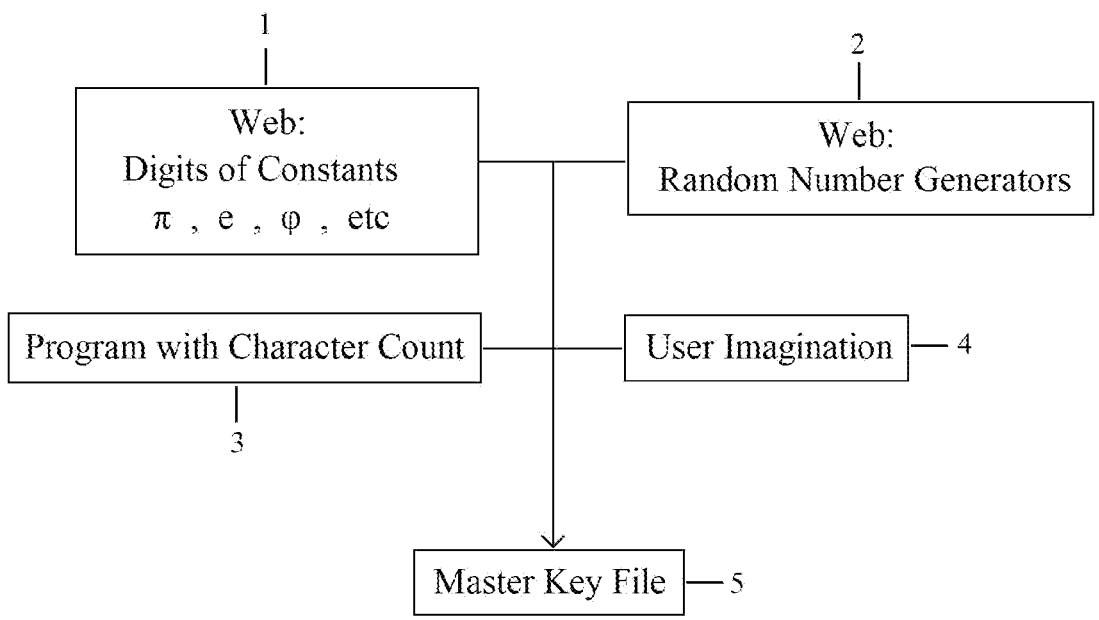
FIG. 48 shows the resources available for creating a master key.
FIG. 49 shows master key requirements.
FIG. 50 shows a recommendation for key formatting.
FIG. 51 shows general master key form.

FIGS. 48-1: Free web resources exist that present thousands and, in some cases, even millions of digits of various mathematical constants that may aid the user in the creation of a Master Key.

FIGS. 48-2: Random number generators may be used to aid in the creation of a Master Key.

FIGS. 48-3: Programs with Character Count may be used to quickly count the number of digits of a Master Key in progress.

FIGS. 48-4: User imagination may be used to enhance and augment available resources.

FIGS. 48-5: The Master Key File is obtained when the completed Master Key as desired by the user is saved to a Text File.

FIG. 49: The Master Key requirements are that the Master Key be a positive integer with at least 322 digits. The Master Key should be composed of an even number of digits, and the last digit of the Master Key should be 0.

FIG. 50: Although not necessary in all cases, it is recommended to begin a Master Key with '10', in order to gain the greatest range of compatibility with Text to be encrypted. When this is done, a Key becomes compatible with Encoded Texts that begin with any character-encoding from '11' up to '88' on the Cipher Chart (See FIG. 9).

FIG. 51: For reference, the recommended general Master Key form is:

$$10XXX...XXX0$$

Figure 52:
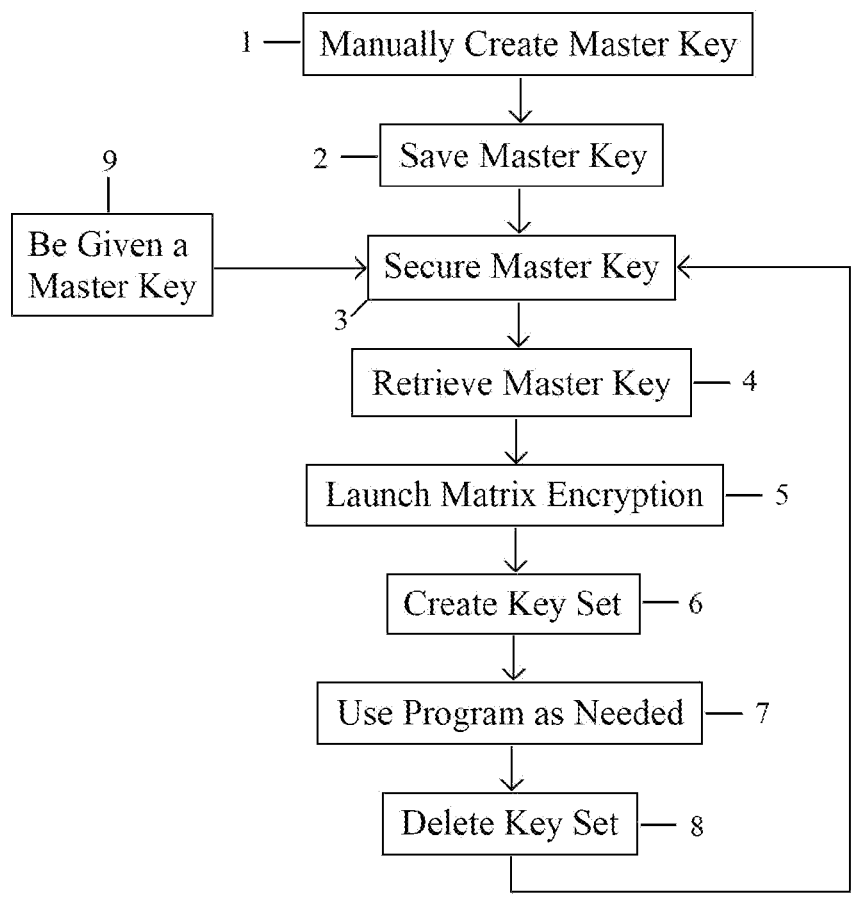
FIG. 52 shows the general procedure for master key use.

FIGS. 52-1: A user will manually create a Master Key.

FIGS. 52-2: After creating the Master Key, the user will save the Master Key to a Text File.

FIGS. 52-3: After Saving the Master Key to a Text File, the user will secure the Master Key onto an external storage device, placing the storage device in a secure location.

FIGS. 52-4: When the user is ready to use the Master Key, the user will retrieve the storage device from the secure location.

FIGS. 52-5: After retrieving the storage device, the user will launch the encryption program to create a Key Set.

FIGS. 52-6: Using the Master Key stored on the storage device, the user will register and create a Key Set.

FIGS. 52-7: After creating a Key Set, the user will use the encryption program and the decryption program as needed.

FIGS. 52-8: When the user is done using the programs as needed, the user will delete the Key Set and any other related files and then return the Master Key on the storage device to a secure storage location.

FIGS. 52-9: Alternatively, and essential to secure communication between users, a user may be given a Master Key File on an external storage device in order to establish a secure means of communication between users.

FIG. 53: An example CBDF-Mod solve is shown, whereby the number $X=2518022393$ generates the number $f(X)=3266220155$.

FIG. 54: An example CBDI-Mod solve is shown, whereby the number $x=3266220155$ generates the number $f(x)=2518022393$.

FIG. 55: An example CBDF-Mod solve with Key implementation is shown whereby the number $X=2518022393$ and the Key, $Key=5272534299$ are used to generate the number $f(X)=8011501024$.

FIG. 56: An example CBDI-Mod solve with Key implementation is shown, whereby the number $x=8011501024$, and the Key, $Key=5272534299$ are used to generate the number $f(x)=2518022393$.

FIG. 57: An example CBDI-Mod solve is shown, wherein an incorrect Key is used. In this case letting $x=8011501024$, and using $Key=664458466$, results in $f(x)=7126098225$ which is not equal to $2518022393$.

FIG. 58: An example of two consecutive Data Log entries are shown, in which the Sample Message was encrypted and decrypted using Zelda_Key_322.

FIG. 59: An example of the failed decryption of a message is shown. The Encrypted Message is the Sample Message as encrypted using Zelda_Key_322. Using Watson_Key_322 fails to recover the original Text. Note that the first character 'W' of the decrypted Text is the correct first letter of the Sample Message that begins with the word 'Welcome'. This is caused by the standard use of '10' at the beginning of Keys, which is itself done to cause Keys in general to be smaller than the Compliment of most Encrypted Texts.

FIG. 60: An example of using an irrelevant first character is shown. In this case a version of the Sample Message that begins with ' ' (i.e., an underscore) and has no period at the end of the sentence is used. The Text is encrypted using Zelda_Key_322. After that an attempt is made to decrypt the Encrypted Text using Watson_Key_322. The result is that the first character ' ' correctly decrypts, because Watson_Key_322 and Zelda_Key_322 both begin with '10', but since ' ' is an irrelevant character, none of the vital contents of the original Text are easily revealed by the random use of an incorrect Key.

FIG. 61: It is recommended that a single irrelevant character be placed at the beginning of Text to be encrypted in conjunction with beginning Keys or Master Keys with '10' (See FIG. 50).

FIG. 62: Shown herein is a Calculation of the Percentage Range of Usable Keys of Length D. We begin by establishing the progression of the number of integers with a given number of digits, that is, that there are 9 one-digit integers, 90 two-digit integers, 900 three-digit integers, and so forth.

Next, we let N be a positive integer with at least 322 digits and possessing an even number of digits.

Letting D represent the number of digits of N, we can write an expression for the number of integers of length D, letting E represent the number of integers of length D, as follows:

$$E=9*10^{D-1}$$

Letting F be the Number of Usable Keys of length D, that end in '0' and begin with '10', we must subtract 3 from the exponent as follows:

$$F=9*10^{D-4}$$

With D=322, the Chance of Guessing the Smallest Possible Key in Matrix Encryption follows:

$$1 \text{ in } 9*10^{318}$$

Calling G 'the Percentage of Usable Keys of Length D' we can write:

$$G=F/E*100\%$$

We can then plug in any value for D in calculating G, and get the constant:

$$G=10^{-3}=0.1\%$$

Returning to the fact that beginning Keys with '10' is at least partially optional, when the recommendation is ignored, F becomes $F=9*10^{D-2}$, and we get the following upper bound for G:

$$G \leq 10\%$$

This allows us to write the 'Naïve Range of G' as follows:

Naïve Range of G $$0.1 \leq \% \text{ } G < 10\%$$

We call it the Naïve Range because it does not take into account the fact that the Encoded Text ranges. Looking at the possible range of the first two digits of the Encoded Text via the Cipher Chart, we find that the range is from a minimum of '11' up to a maximum of '99', skipping any assignments that end in '0' for a total of 81 possibilities.

When the Encoded Text begins with '11', G will be at its maximum. With 90 possibilities for the first 2 digits of the Key, namely from '10' to '99', it becomes apparent that a Key beginning with '88' may be too large, and that Keys beginning with '89', '90', '91', '92', '93', '94', '95', '96', '97', '98', and '99' are necessarily too large. Counting the number of such instances to be 12, we get the Percentage of Keys too Large for Encoded Text beginning with '11':

$$12/90=13.33\%$$

Thus, the Percentage of integers compatible with Encoded Text when the first two digits of the Encoded Text are at their Minimum Value, is:

$$78/90=86.66\%$$

Since only 10% of such integer values will end in '0', we arrive at the true Upper Bound of G:

$$G \leq 8.66\%$$

As stated, the maximum value of the first two digits of any Encoded Text is '99'. An Encoded Text that starts out with '99' causes F to equal 0 and causes G to equal 0.00%, because there are no possible Keys of sufficient length that will not be too large. This allows us to write the 'Unrefined Range of G':

Unrefined Range of G:

$$0.00\% \leq G \leq 8.66\%$$

Though the Unrefined Range of G drops as low as 0% as the first two digits of the Encoded Text approach their maximum possible value of '99', in practical terms, G will never be less than 0.1%, as long as it is ensured that the first two digits of the Encoded Text are not greater than '88', because in this case, any integer of appropriate length beginning with '10' and ending in '0' will constitute a usable Key. Moreover, G is independent of the value of D and does not decrease as D increases. Finally, we can write the 'Refined Range of G':

Refined Range of G $$0.1\% \leq G \leq 8.66\%$$

FIG. 63: Shown herein, is the rationale for why '0' is avoided as the last digit of the Keyed Encoded Text.

Firstly, it is done to preserve injectivity of CBDF-Mod, and by association the validity of CBDI-Mod. A function is said to be injective if no two elements in the domain result in the same output in the range. CBDF-Mod is not naturally injective but is made injective by avoiding inputs that end in '0'. Let N be an integer ending in '0', then performing CBDF-Mod on N results in M, and performing CBDF-Mod on N−1 also results in M. This would not be resolvable for CBDI-Mod of M.

Secondly, '0' is avoided as the ending digit of Keyed Encoded Texts, because doing so preserves the scaling solution for $\lceil X/10 \rceil$. The scaling solution always works as long as the last digit of X is not '0'. For example, if X=25180, $\lceil X/10 \rceil$=2518, however the scaling solution effectively removes the last digit and adds 1, resulting in 2519 in this case, which is incorrect.

There are a total of 81 two-digit character assignments in the Cipher Chart. The values 10, 20, 30, 40, 50, 60, 70, 80, and 90 are vacant, however remain unassigned for the above-mentioned reasons.

FIG. 64: Shown herein is a calculation of the Error Limit of the Scaling Solution to $\lfloor (z-x) \rfloor$.

Floating point decimal rounding error is typically encountered after 16 digits. Rounding error from the Scaling Solution to $\lfloor (z-x)/9 \rfloor$ can only arise from the sum of digits of (z−x), and will only arise if:

$$\text{Length(Sum of digits}(z-x)) \geq 17$$

So we want to calculate the size of the smallest integer in Bytes such that the sum of digits of the integer will itself be a number with 17 digits.

Using induction, we start by establishing that the smallest integer with a digit sum of 10 is 19 because 1+9=10. No integer smaller than 19 has this property. 19 can be expressed as:

$$19=2*10^1-1$$

2 digits

Next, we establish that the smallest integer with a digit sum of 100 is the number 199,999,999,999 because 1+9+9+9+9+9+9+9+9+9+9+9=100. And:

$$199,999,999,999=2*10^{11}-1$$

12 digits

The smallest integer with a digit sum of 1000 then, is the integer:

$$2*10^{111}-1$$

112 digits

Therefore, the smallest integer with a digit sum of 10,000,000,000,000,000 is:

$$2*10^{1,111,111,111,111,111}-1$$

1,111,111,111,111,112 digits

In ASCII, each character represents 1 Byte of information, therefore the size of the smallest integer with a digit sum of 10,000,000,000,000,000 in Bytes is:

1,111,111,111,111,112 Bytes

Recalling that the Encrypted Text is twice the length of the original Text, we divide by 2, resulting in the Rounding Error Limit in Bytes for Text:

555,555,555,555,556 Bytes

Since 1 Petabyte=$10^{15}$ Bytes, we can write the Rounding Error Limit in Bytes for Text as:

≈0.56 Petabytes

It should be noted that this error limit once breached, would start out only affecting the very end of Texts in excess of 0.56 Petabytes because the division by 9 occurs in the corrective term which is much smaller than the Trimmed Sum (See FIG. 36).

Figure 65:
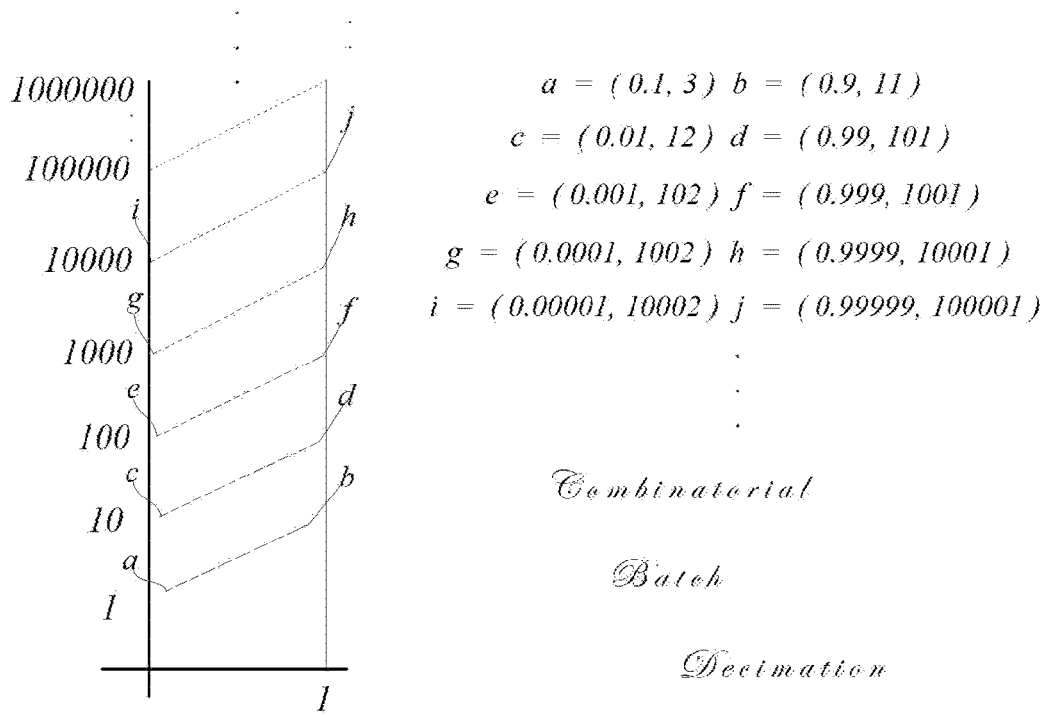
FIG. 65 shows the original CBD Function with respective graph.

FIG. 65: Shown herein is the Original CBD Function. It is defined for all terminating decimals between 0 and 1. The CBD Function is a discrete iterative bijection from the set of all terminating decimals inside the open interval from 0 to 1, onto all integers greater than or equal to 3. Though the CBD Function iterates to infinity over the interval from 0 to 1, the Vertical Line Test is never failed because no matter how near, a different value of X is always used. Decimals ending in '0' were always counted at the previous iteration. The graph grows so rapidly that it can only reasonably be drawn using a log fit on the y-axis. For this reason, CBD is sometimes referred to as the Geyser Function.

Figure 66:
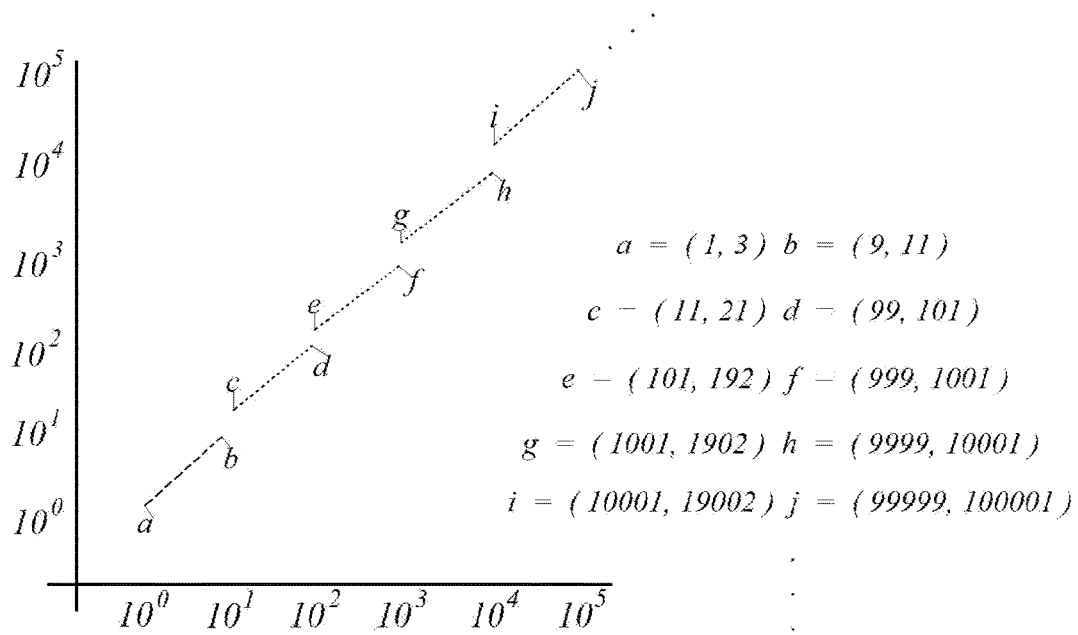
FIG. 66 shows the modified CBD Function, CBDF-Mod, with respective graph.

FIG. 66: CBDF-Mod is a Scaling Solution to the inherent problem of the Original CBD Function in being designed to count decimals. By redefining the domain to be all positive integers, with some slight modification to the expression, the inherent rounding error in dealing with decimals is bypassed. Values of X ending in '0' are intentionally skipped.

Note that the x and y values of the end points are always in the same digital root class, for example the y-component of 'a' is 3. The y-component of 'g' is 1902 and 1+9+0+2=12→1+2=3.

The graph of CBDF-Mod also grows rapidly, and the graph is depicted using a log fit on both the x-axis and the y-axis.

The invention claimed is:

1. A computer-implemented method performed by one or more computers executing a readable pair of software programs that together facilitate clandestine communication between parties secured by a symmetric key system implemented onto an asymmetric architecture, the computer-implemented method comprising:

receiving plaintext data from a first user, the plaintext data comprising a string of characters;

encoding the plaintext data by converting each character of the string of characters in the plaintext data to an integer within the range of [11, 99] in accordance with a character map, thereby creating encoded data;

receiving a secret numeric key from the first user, wherein the digit count of the secret numeric key must equal twice the character count of the received plaintext data and wherein the sum of the secret numeric key plus the encoded data must not have a digit count greater than the digit count of the secret numeric key;

creating keyed encoded data by adding the secret numeric key to the encoded data;

performing a Modified Combinatorial Batch Decimation Function (CBDF-Mod) on the keyed encoded data to produce encrypted data, wherein the Modified Combinatorial Batch Decimation Function (CBDF-Mod) is given by:

$f(X)=z+(R-\lceil X/10\rceil)+(X-Z)$, wherein:

X is the keyed encoded data, $T$=length(X), $Z=10^T-1$ $z=10^T+1$, and $R=10_{T-1}$;

saving the encrypted data to a first user designated file;

receiving the encrypted data in the first user designated file from a second user, wherein the first user and the second user may be the same user or different users;

receiving the secret numeric key from the second user;

subtracting the secret numeric key from the encrypted data to produce unlocked encrypted data;

performing a Modified Inverse Combinatorial Batch Decimation Function (CBDI-Mod) on the unlocked encrypted data to reproduce the encoded data, wherein the Modified Inverse Combinatorial Batch Decimation Function (CBDI-Mod) is given by:

$f(x)=Z-(\lfloor(z-x)/9\rfloor+z-x)$, wherein:

x is the unlocked encrypted data,

T=length(x), $Z=10^T-1$, and $z=10^T+1$;

decoding the reproduced encoded data to restore the reproduced encoded data to the plaintext data received from the first user, the decoding performed by converting each pair of integers within the range of [11, 99] in the reproduced encoded data to a character in accordance with the character map; and saving the restored plaintext data to a second user designated file.

2. The computer-implemented method of claim 1, wherein a first program of the pair of software programs accomplishes the encrypting of keyed encoded data and the saving of encrypted data.

3. The computer-implemented method of claim 2, wherein the first program gives the first user the option to create a Set of Key Files from a Master Key during a registration of the first program.

4. The computer-implemented method of claim 3, wherein the Master Key is a positive integer created manually by the user.

5. The computer-implemented method of claim 1, wherein a second program of the pair of software programs accomplishes the decrypting of the encrypted data and the saving of the restored plaintext data.

6. The computer-implemented method of claim 1, wherein a the first user must register an account in order to login and create a set of user files, the set of user files comprising:
   a personal encryption file for the first user;
   a personal decryption file for the first user; and
   a data log file for the first user.

7. A non-transitory computer-readable storage device with a readable pair of software programs stored thereon that together facilitate clandestine communication between parties secured by a symmetric key system implemented onto an asymmetric architecture and that, when executed by one or more computer processors, cause the one or more computer processors to perform operations comprising:
   receiving plaintext data from a first user, the plaintext data comprising a string of characters;
   encoding the plaintext data by converting each character of the string of characters in the plaintext data to an integer within the range of [11, 99] in accordance with a character map, thereby creating encoded data;
   receiving a secret numeric key from the first user, wherein the digit count of the secret numeric key must equal twice the character count of the received plaintext data and wherein the sum of the secret numeric key plus the encoded data must not have a digit count greater than the digit count of the secret numeric key;
   creating keyed encoded data by adding the secret numeric key to the encoded data;
   performing a Modified Combinatorial Batch Decimation Function (CBDF-Mod) on the keyed encoded data to produce encrypted data, wherein the Modified Combinatorial Batch Decimation Function (CBDF-Mod) is given by:

$f(X)=z+(R-\lceil X/10 \rceil)+(X-Z)$, wherein:

X is the keyed encoded data, $T=\text{length}(X)$, $Z=10^T-1$, $z=10^T+1$, and $R=10^{T-1}$;

saving the encrypted data to a first user designated file;
   receiving the encrypted data in the first user designated file from a second user, wherein the first user and the second user may be the same user or different users;
   receiving the secret numeric key from the second user;
   subtracting the secret numeric key from the encrypted data to produce unlocked encrypted data;
   performing a Modified Inverse Combinatorial Batch Decimation Function (CBDI-Mod) on the unlocked encrypted data to reproduce the encoded data, wherein the Modified Inverse Combinatorial Batch Decimation Function (CBDI-Mod) is given by:

$f(x)=Z-(\lfloor (z-x)/9 \rfloor + z-x)$, wherein:

x is the unlocked encrypted data, $T=\text{length}(x)$, $Z=10^T-1$, and $z=10^T+1$;

decoding the reproduced encoded data to restore the reproduced encoded data to the plaintext data received from the first user, the decoding performed by converting each pair of integers within the range of [11, 99] in the reproduced encoded data to a character in accordance with the character map; and
   saving the restored plaintext data to a second user designated file.

8. The non-transitory computer-readable storage device of claim 7, wherein a first program of the pair of software programs accomplishes the encrypting of keyed encoded data and the saving of encrypted data.

9. The non-transitory computer-readable storage device of claim 8, wherein the first program gives the first user the option to create a Set of Key Files from a Master Key during a registration of the first program.

10. The non-transitory computer-readable storage device of claim 9, wherein the Master Key is a positive integer created manually by the user.

11. The non-transitory computer-readable storage device of claim 7, wherein a second program of the pair of software programs accomplishes the decrypting of the encrypted data and the saving of the restored plaintext data.

12. The non-transitory computer-readable storage device of claim 7, wherein the first user must register an account in order to login and create a set of user files, the set of user files comprising:
    a personal encryption file for the first user;
    a personal decryption file for the first user; and
    a data log file for the first user.

13. A computer system comprising a computer processor and a memory, the memory storing a readable pair of software programs stored thereon that together facilitate clandestine communication between parties secured by a symmetric key system implemented onto an asymmetric architecture and that, when executed by the computer processor, causes the computer processor to perform operations comprising:
    receiving plaintext data from a first user, the plaintext data comprising a string of characters;
    encoding the plaintext data by converting each character of the string of characters in the plaintext data to an integer within the range of [11, 99] in accordance with a character map, thereby creating encoded data;
    receiving a secret numeric key from the first user, wherein the digit count of the secret numeric key must equal twice the character count of the received plaintext data and wherein the sum of the secret numeric key plus the encoded data must not have a digit count greater than the digit count of the secret numeric key;

creating keyed encoded data by adding the secret numeric key to the encoded data;
performing a Modified Combinatorial Batch Decimation Function (CBDF-Mod) on the keyed encoded data to produce encrypted data, wherein the Modified Combinatorial Batch Decimation Function (CBDF-Mod) is given by:

$f(X)=z+(R-\lceil X/10 \rceil)+(X-Z)$, wherein:

X is the keyed encoded data,

T=length(X), $Z=10^T-1$, $z=10^T+1$, and $R=10^{T-1}$;

saving the encrypted data to a first user designated file;
receiving the encrypted data in the first user designated file from a second user, wherein the first user and the second user may be the same user or different users;
receiving the secret numeric key from the second user;
subtracting the secret numeric key from the encrypted data to produce unlocked encrypted data;
performing a Modified Inverse Combinatorial Batch Decimation Function (CBDI-Mod) on the unlocked encrypted data to reproduce the encoded data, wherein the Modified Inverse Combinatorial Batch Decimation Function (CBDI-Mod) is given by:

$f(x)=Z-(\lfloor (z-x)/9 \rfloor + z - x)$, wherein:

x is the unlocked encrypted data,

T=length(x), $Z=10^T-1$, and $z=10^T+1$;

decoding the reproduced encoded data to restore the reproduced encoded data to the plaintext data received from the first user, the decoding performed by converting each pair of integers within the range of [11, 99] in the reproduced encoded data to a character in accordance with the character map; and
saving the restored plaintext data to a second user designated file.

14. The computer system of claim 13, wherein a first program of the pair of software programs accomplishes the encrypting of keyed encoded data and the saving of encrypted data.

15. The computer system of claim 14, wherein the first program gives the first user the option to create a Set of Key Files from a Master Key during a registration of the first program.

16. The computer system of claim 15, wherein the Master Key is a positive integer created manually by the user.

17. The computer system of claim 13, wherein a second program of the pair of software programs accomplishes the decrypting of the encrypted data and the saving of the restored plaintext data.

18. The computer system of claim 13, wherein the first user must register an account in order to login and create a set of user files, the set of user files comprising:
a personal encryption file for the first user;
a personal decryption file for the first user; and
a data log file for the first user.

* * * * *